US012667777B2

(12) United States Patent
Oi et al.

(10) Patent No.: US 12,667,777 B2
(45) Date of Patent: Jun. 30, 2026

(54) COMPUTER SYSTEM, VIRTUAL SPACE CONTROL SYSTEM, AND VIRTUAL SPACE CONTROL METHOD

(71) Applicant: BANDAI NAMCO ENTERTAINMENT INC., Tokyo (JP)

(72) Inventors: Takayoshi Oi, Suginami-ku (JP); Koji Asuna, Koto-ku (JP); Kiyoshi Minami, Yokohama (JP); Kenichi Ogura, Kodaira (JP); Akio Onda, Warabi (JP); Takashi Aoki, Funabashi (JP); Shintaro Murai, Kita-ku (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 110 days.

(21) Appl. No.: 18/886,040

(22) Filed: Sep. 16, 2024

(65) Prior Publication Data

US 2025/0001293 A1 Jan. 2, 2025

Related U.S. Application Data

(63) Continuation of application No. PCT/JP2023/009093, filed on Mar. 9, 2023.

(30) Foreign Application Priority Data

Mar. 30, 2022 (JP) ................................. 2022-056819

(51) Int. Cl.
*A63F 13/355* (2014.01)
(52) U.S. Cl.
CPC ................................. *A63F 13/355* (2014.09)

(58) Field of Classification Search
CPC ...... A63F 13/355; A63F 13/35; A63F 13/352; A63F 13/45; A63F 13/533; A63F 13/75; A63F 13/79
See application file for complete search history.

(56) References Cited

U.S. PATENT DOCUMENTS 9,452,364 B1 * 9/2016 Curtis ..................... A63F 13/35
10,300,379 B1 * 5/2019 Wakeford ............. A63F 13/335
(Continued)

FOREIGN PATENT DOCUMENTS

JP 2001-312744 A 11/2001
JP 2010-213806 A 9/2010

OTHER PUBLICATIONS

Apr. 25, 2023 International Search Report issued in International Patent Application No. PCT/JP2023/009093.
(Continued)

*Primary Examiner* — El Hadji M Sall
(74) *Attorney, Agent, or Firm* — Oliff PLC

(57) ABSTRACT
A computer system controls in parallel multiple virtual spaces that are set so as to have a common world view and that enables users to change their participation virtual spaces, manages occurrence incidents, which are incidents that occur or probably occur in each virtual space, and manages a target user's participation record for the first virtual space. Moreover, the computer system manages a restriction on target user's participation in a virtual space other than the first virtual space, based on (a) the difference between the first occurrence incident, which is an occurrence incident in the first virtual space, and an occurrence incident in the virtual space other than the first virtual space, and (b) the target user's participation record for the first virtual space.

19 Claims, 20 Drawing Sheets

(56) References Cited

U.S. PATENT DOCUMENTS

| | | | |
|---|---|---|---|
| 11,325,038 B2 * | 5/2022 | Tsutsumizaki | ........ A63F 13/847 |
| 2002/0158917 A1 * | 10/2002 | Sinclair | .................. A63F 13/35 |
| | | | 715/850 |
| 2009/0116641 A1 | 5/2009 | Bokor et al. | |
| 2015/0011277 A1 * | 1/2015 | Wakeford | ............... A63F 13/35 |
| | | | 463/1 |
| 2016/0206959 A1 * | 7/2016 | Nelson | ................... A63F 13/35 |

OTHER PUBLICATIONS

NCSoft Corporation. Guide of Server Transfer, Lineage2M, Official Website, NCSoft Corporation., [Online]. Mar. 23, 2022, [Retrieval Date Apr. 10, 2023], Internet: <Url:https://lineage2m.ncsoft.jp/board/notice/view?articleid=623A27714BF49B0001531632>.

* cited by examiner

10     REGULAR EVENT
(REPETITIVE INVOLVEMENT
PERMISSION EVENT)

DROP ITEM

ENCOUNTERED COMBAT

SPECIAL EVENT
12     (REPETITIVE INVOLVEMENT
PROHIBITION EVENT)

DUNGEON
ATTACK

ACQUISITION OF
RARE ITEM

FIG.9

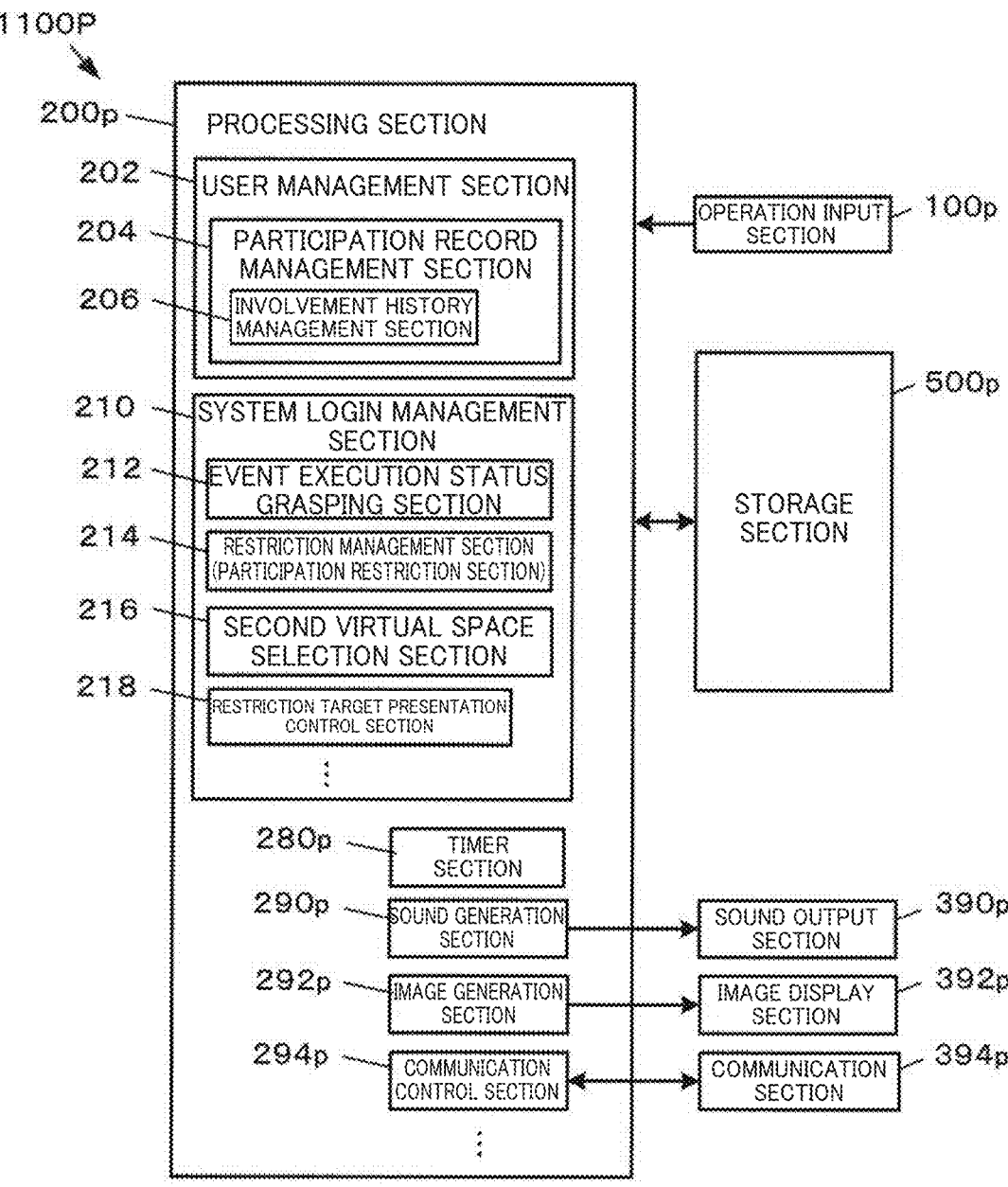

1100P

200p — PROCESSING SECTION

202 — USER MANAGEMENT SECTION

204 — PARTICIPATION RECORD MANAGEMENT SECTION

206 — INVOLVEMENT HISTORY MANAGEMENT SECTION

210 — SYSTEM LOGIN MANAGEMENT SECTION

212 — EVENT EXECUTION STATUS GRASPING SECTION

214 — RESTRICTION MANAGEMENT SECTION (PARTICIPATION RESTRICTION SECTION)

216 — SECOND VIRTUAL SPACE SELECTION SECTION

218 — RESTRICTION TARGET PRESENTATION CONTROL SECTION

100p — OPERATION INPUT SECTION

500p — STORAGE SECTION

280p — TIMER SECTION

290p — SOUND GENERATION SECTION

390p — SOUND OUTPUT SECTION

292p — IMAGE GENERATION SECTION

392p — IMAGE DISPLAY SECTION

294p — COMMUNICATION CONTROL SECTION

394p — COMMUNICATION SECTION

FIG.10

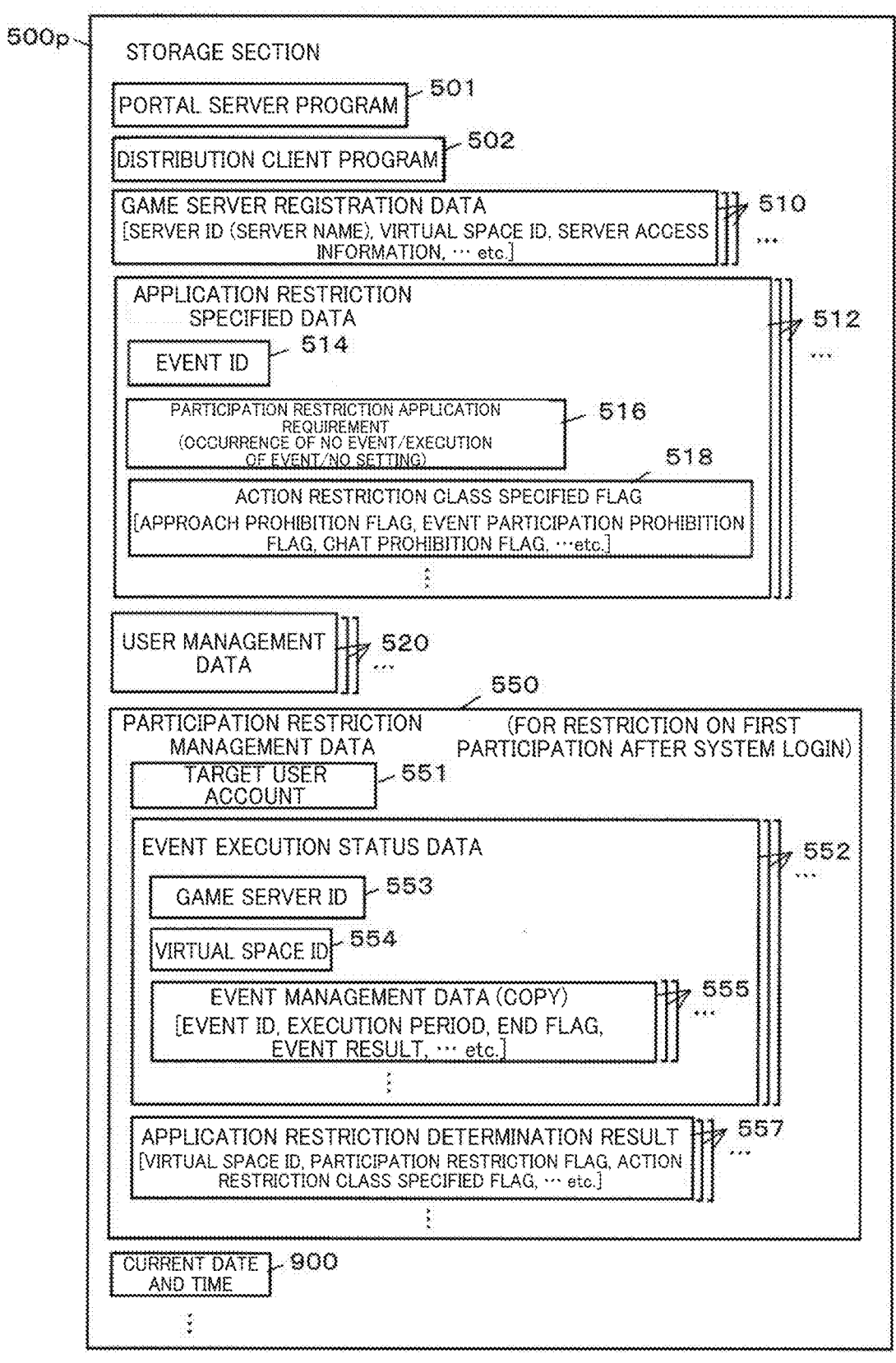

500p

STORAGE SECTION

PORTAL SERVER PROGRAM — 501

DISTRIBUTION CLIENT PROGRAM — 502

GAME SERVER REGISTRATION DATA
[SERVER ID (SERVER NAME), VIRTUAL SPACE ID, SERVER ACCESS INFORMATION, ⋯ etc.] — 510 ⋯

APPLICATION RESTRICTION SPECIFIED DATA — 512 ⋯

EVENT ID — 514

PARTICIPATION RESTRICTION APPLICATION REQUIREMENT
(OCCURRENCE OF NO EVENT/EXECUTION OF EVENT/NO SETTING) — 516

ACTION RESTRICTION CLASS SPECIFIED FLAG
[APPROACH PROHIBITION FLAG, EVENT PARTICIPATION PROHIBITION FLAG, CHAT PROHIBITION FLAG, ⋯etc.] — 518

USER MANAGEMENT DATA — 520 ⋯

PARTICIPATION RESTRICTION MANAGEMENT DATA — 550 　　(FOR RESTRICTION ON FIRST PARTICIPATION AFTER SYSTEM LOGIN)

TARGET USER ACCOUNT — 551

EVENT EXECUTION STATUS DATA — 552 ⋯

GAME SERVER ID — 553

VIRTUAL SPACE ID — 554

EVENT MANAGEMENT DATA (COPY)
[EVENT ID, EXECUTION PERIOD, END FLAG, EVENT RESULT, ⋯ etc.] — 555 ⋯

APPLICATION RESTRICTION DETERMINATION RESULT
[VIRTUAL SPACE ID, PARTICIPATION RESTRICTION FLAG, ACTION RESTRICTION CLASS SPECIFIED FLAG, ⋯ etc.] — 557 ⋯

CURRENT DATE AND TIME — 900

FIG.11

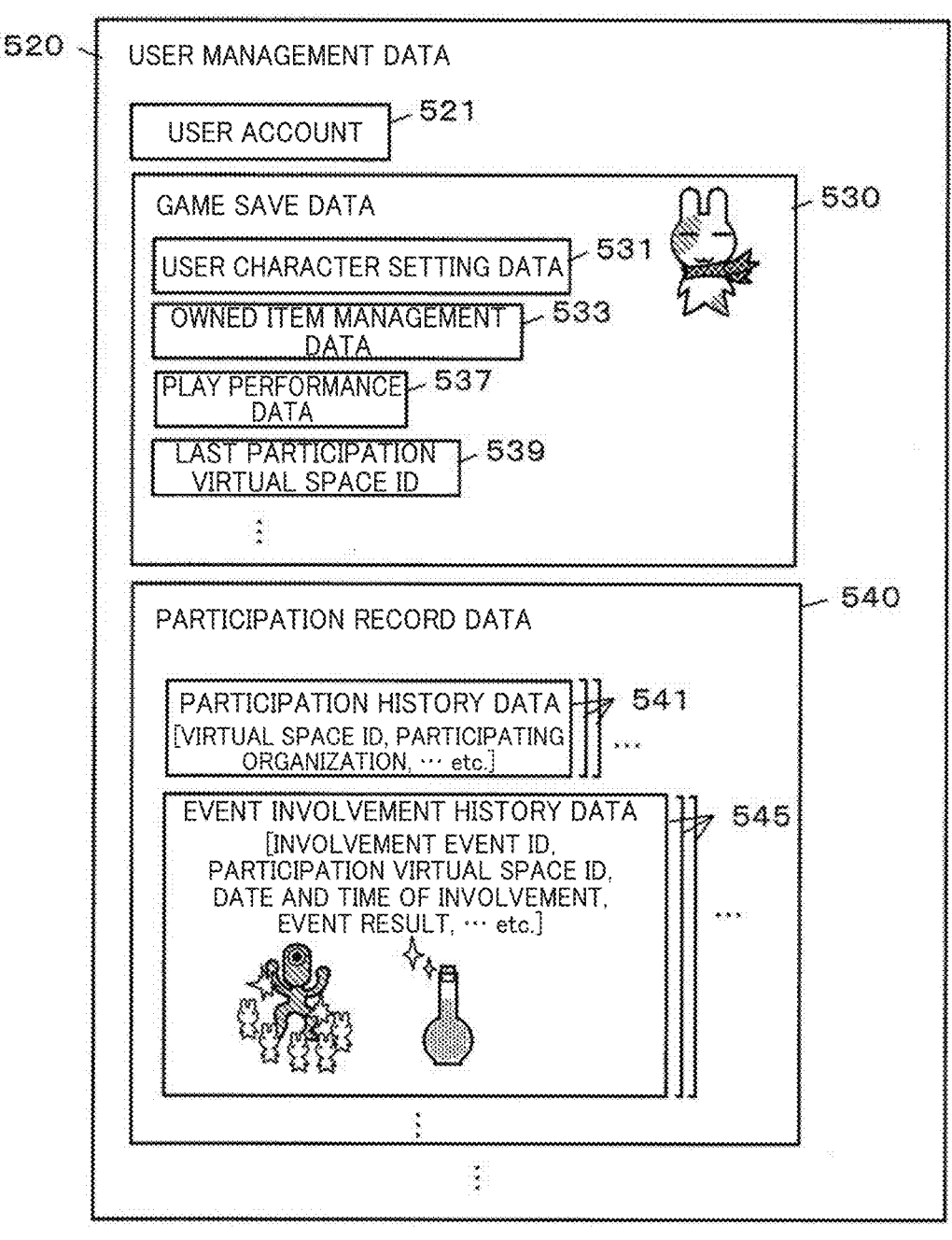

520 — USER MANAGEMENT DATA

USER ACCOUNT — 521

GAME SAVE DATA — 530

USER CHARACTER SETTING DATA — 531

OWNED ITEM MANAGEMENT DATA — 533

PLAY PERFORMANCE DATA — 537

LAST PARTICIPATION VIRTUAL SPACE ID — 539

PARTICIPATION RECORD DATA — 540

PARTICIPATION HISTORY DATA — 541
[VIRTUAL SPACE ID, PARTICIPATING ORGANIZATION, ··· etc.]

EVENT INVOLVEMENT HISTORY DATA — 545
[INVOLVEMENT EVENT ID, PARTICIPATION VIRTUAL SPACE ID, DATE AND TIME OF INVOLVEMENT, EVENT RESULT, ··· etc.]

FIG.12

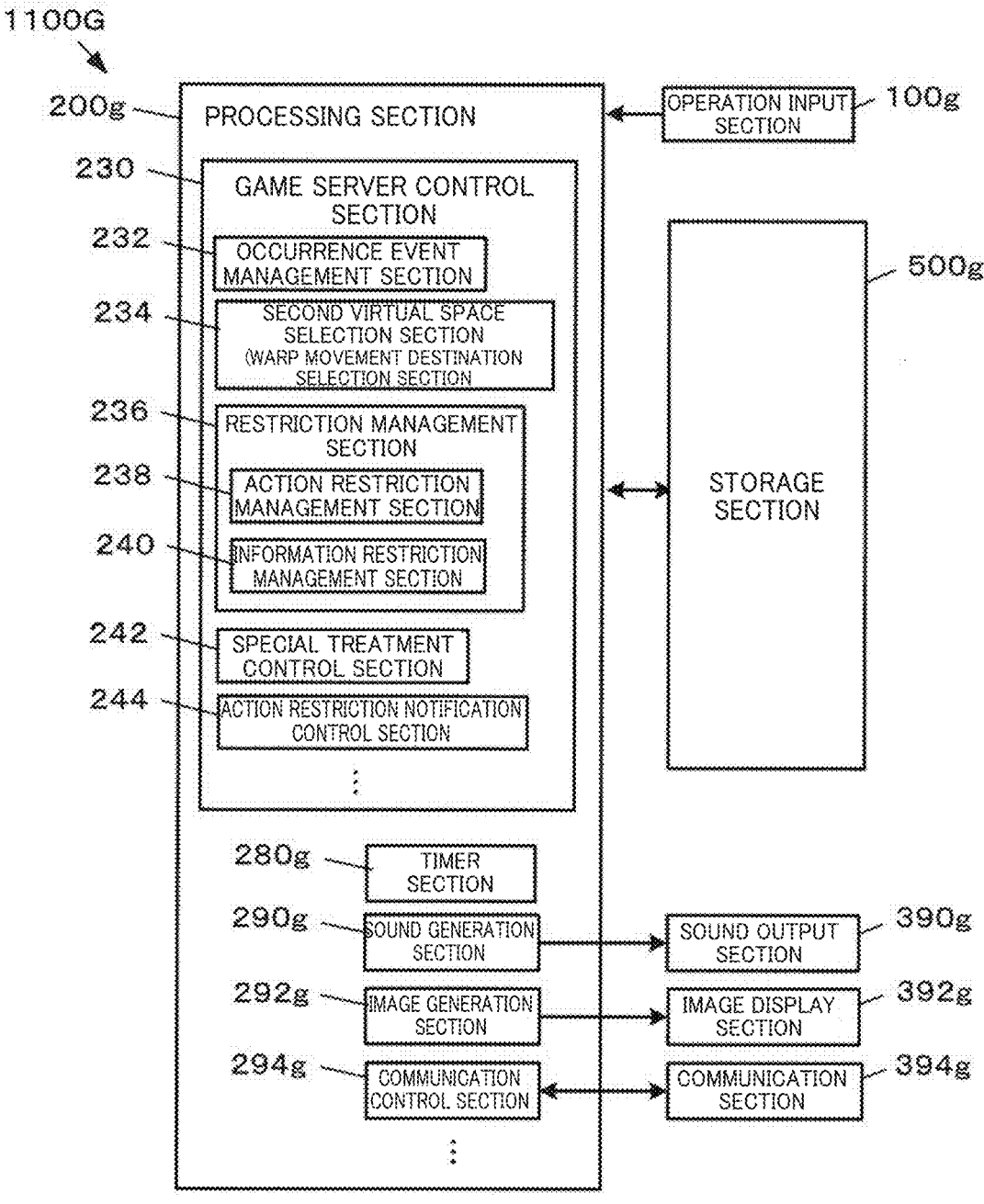

1100G

200g — PROCESSING SECTION

230 — GAME SERVER CONTROL SECTION

232 — OCCURRENCE EVENT MANAGEMENT SECTION

234 — SECOND VIRTUAL SPACE SELECTION SECTION (WARP MOVEMENT DESTINATION SELECTION SECTION)

236 — RESTRICTION MANAGEMENT SECTION

238 — ACTION RESTRICTION MANAGEMENT SECTION

240 — INFORMATION RESTRICTION MANAGEMENT SECTION

242 — SPECIAL TREATMENT CONTROL SECTION

244 — ACTION RESTRICTION NOTIFICATION CONTROL SECTION

280g — TIMER SECTION

290g — SOUND GENERATION SECTION

292g — IMAGE GENERATION SECTION

294g — COMMUNICATION CONTROL SECTION

OPERATION INPUT SECTION — 100g

STORAGE SECTION — 500g

SOUND OUTPUT SECTION — 390g

IMAGE DISPLAY SECTION — 392g

COMMUNICATION SECTION — 394g

FIG.13

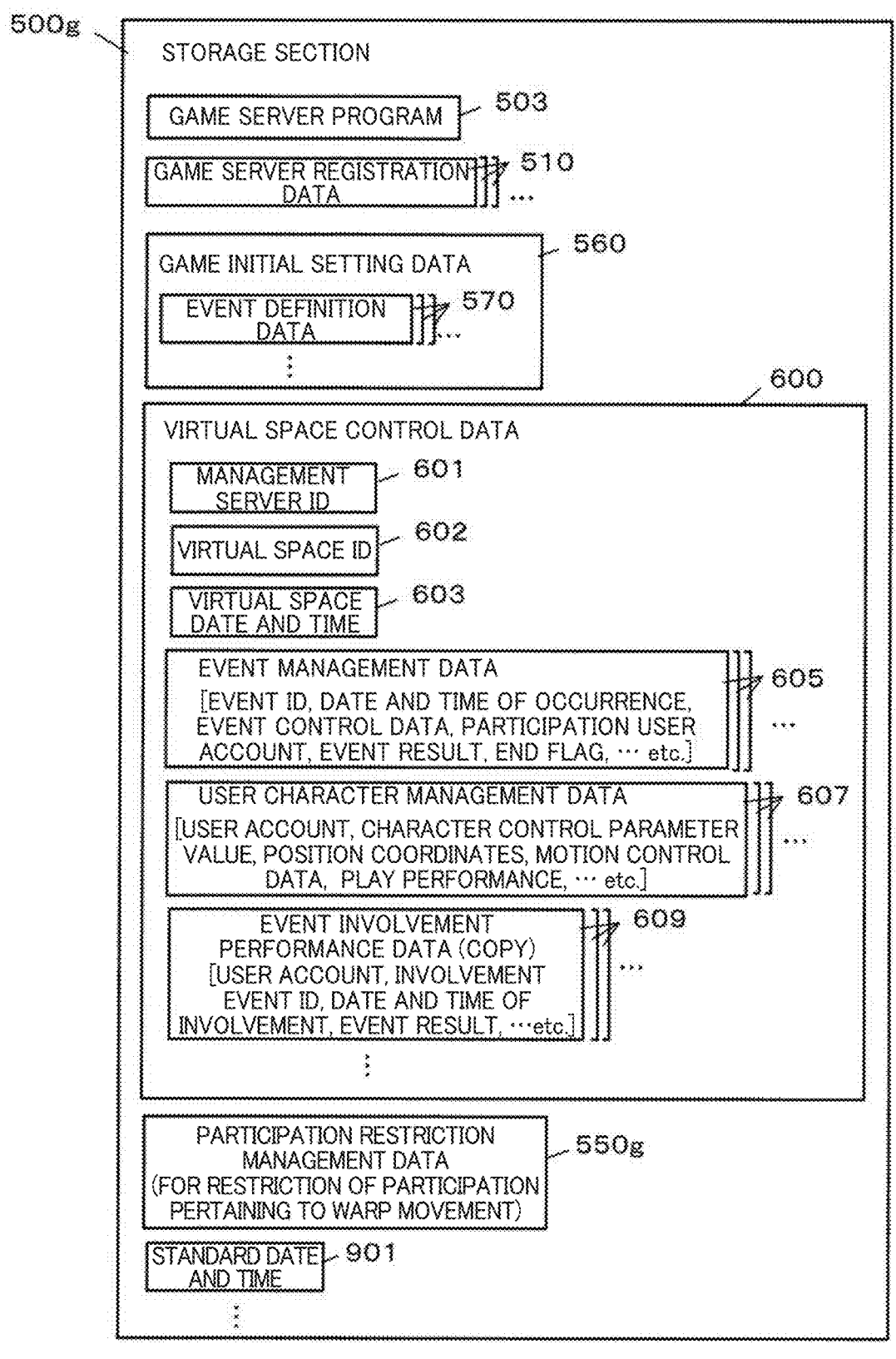

500g

STORAGE SECTION

GAME SERVER PROGRAM — 503

GAME SERVER REGISTRATION DATA — 510 ...

GAME INITIAL SETTING DATA — 560

EVENT DEFINITION DATA — 570 ...

VIRTUAL SPACE CONTROL DATA — 600

MANAGEMENT SERVER ID — 601

VIRTUAL SPACE ID — 602

VIRTUAL SPACE DATE AND TIME — 603

EVENT MANAGEMENT DATA — 605
[EVENT ID, DATE AND TIME OF OCCURRENCE, EVENT CONTROL DATA, PARTICIPATION USER ACCOUNT, EVENT RESULT, END FLAG, ⋯ etc.] ...

USER CHARACTER MANAGEMENT DATA — 607
[USER ACCOUNT, CHARACTER CONTROL PARAMETER VALUE, POSITION COORDINATES, MOTION CONTROL DATA, PLAY PERFORMANCE, ⋯ etc.] ...

EVENT INVOLVEMENT PERFORMANCE DATA (COPY) — 609
[USER ACCOUNT, INVOLVEMENT EVENT ID, DATE AND TIME OF INVOLVEMENT, EVENT RESULT, ⋯etc.] ...

PARTICIPATION RESTRICTION MANAGEMENT DATA — 550g
(FOR RESTRICTION OF PARTICIPATION PERTAINING TO WARP MOVEMENT)

STANDARD DATE AND TIME — 901

FIG.15

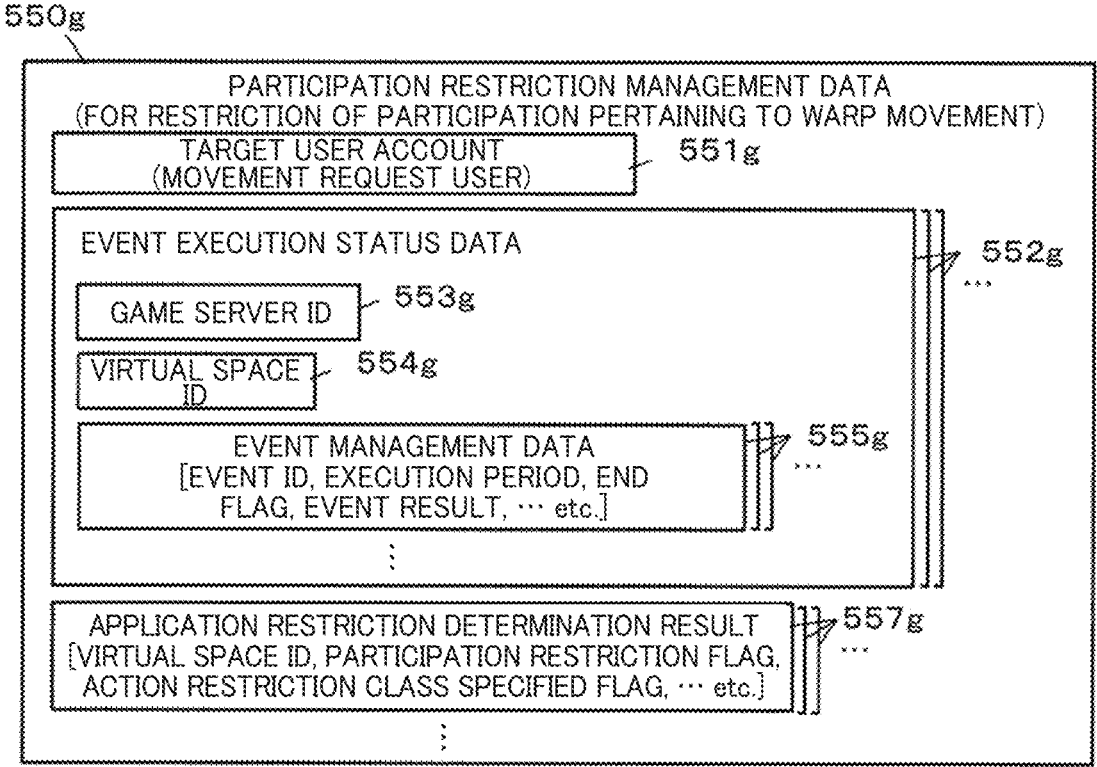

550g

PARTICIPATION RESTRICTION MANAGEMENT DATA
(FOR RESTRICTION OF PARTICIPATION PERTAINING TO WARP MOVEMENT)

TARGET USER ACCOUNT
(MOVEMENT REQUEST USER) — 551g

EVENT EXECUTION STATUS DATA — 552g

GAME SERVER ID — 553g

VIRTUAL SPACE ID — 554g

EVENT MANAGEMENT DATA
[EVENT ID, EXECUTION PERIOD, END
FLAG, EVENT RESULT, ··· etc.] — 555g APPLICATION RESTRICTION DETERMINATION RESULT — 557g
[VIRTUAL SPACE ID, PARTICIPATION RESTRICTION FLAG,
ACTION RESTRICTION CLASS SPECIFIED FLAG, ··· etc.]

FIG.17

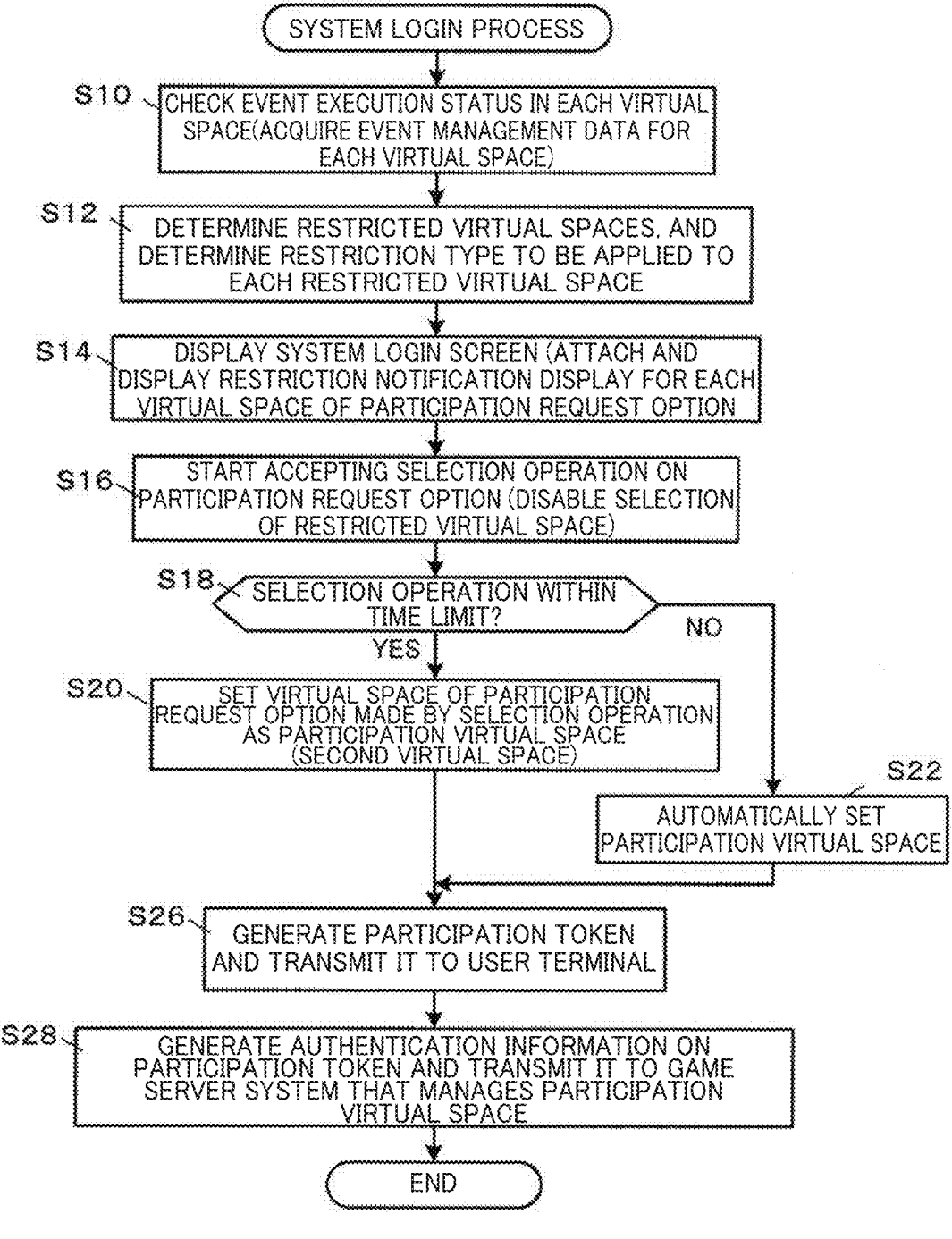

SYSTEM LOGIN PROCESS

S10 — CHECK EVENT EXECUTION STATUS IN EACH VIRTUAL SPACE(ACQUIRE EVENT MANAGEMENT DATA FOR EACH VIRTUAL SPACE)

S12 — DETERMINE RESTRICTED VIRTUAL SPACES, AND DETERMINE RESTRICTION TYPE TO BE APPLIED TO EACH RESTRICTED VIRTUAL SPACE

S14 — DISPLAY SYSTEM LOGIN SCREEN (ATTACH AND DISPLAY RESTRICTION NOTIFICATION DISPLAY FOR EACH VIRTUAL SPACE OF PARTICIPATION REQUEST OPTION

S16 — START ACCEPTING SELECTION OPERATION ON PARTICIPATION REQUEST OPTION (DISABLE SELECTION OF RESTRICTED VIRTUAL SPACE)

S18 — SELECTION OPERATION WITHIN TIME LIMIT?

NO

YES

S20 — SET VIRTUAL SPACE OF PARTICIPATION REQUEST OPTION MADE BY SELECTION OPERATION AS PARTICIPATION VIRTUAL SPACE (SECOND VIRTUAL SPACE)

S22 — AUTOMATICALLY SET PARTICIPATION VIRTUAL SPACE

S26 — GENERATE PARTICIPATION TOKEN AND TRANSMIT IT TO USER TERMINAL

S28 — GENERATE AUTHENTICATION INFORMATION ON PARTICIPATION TOKEN AND TRANSMIT IT TO GAME SERVER SYSTEM THAT MANAGES PARTICIPATION VIRTUAL SPACE

END

FIG.20

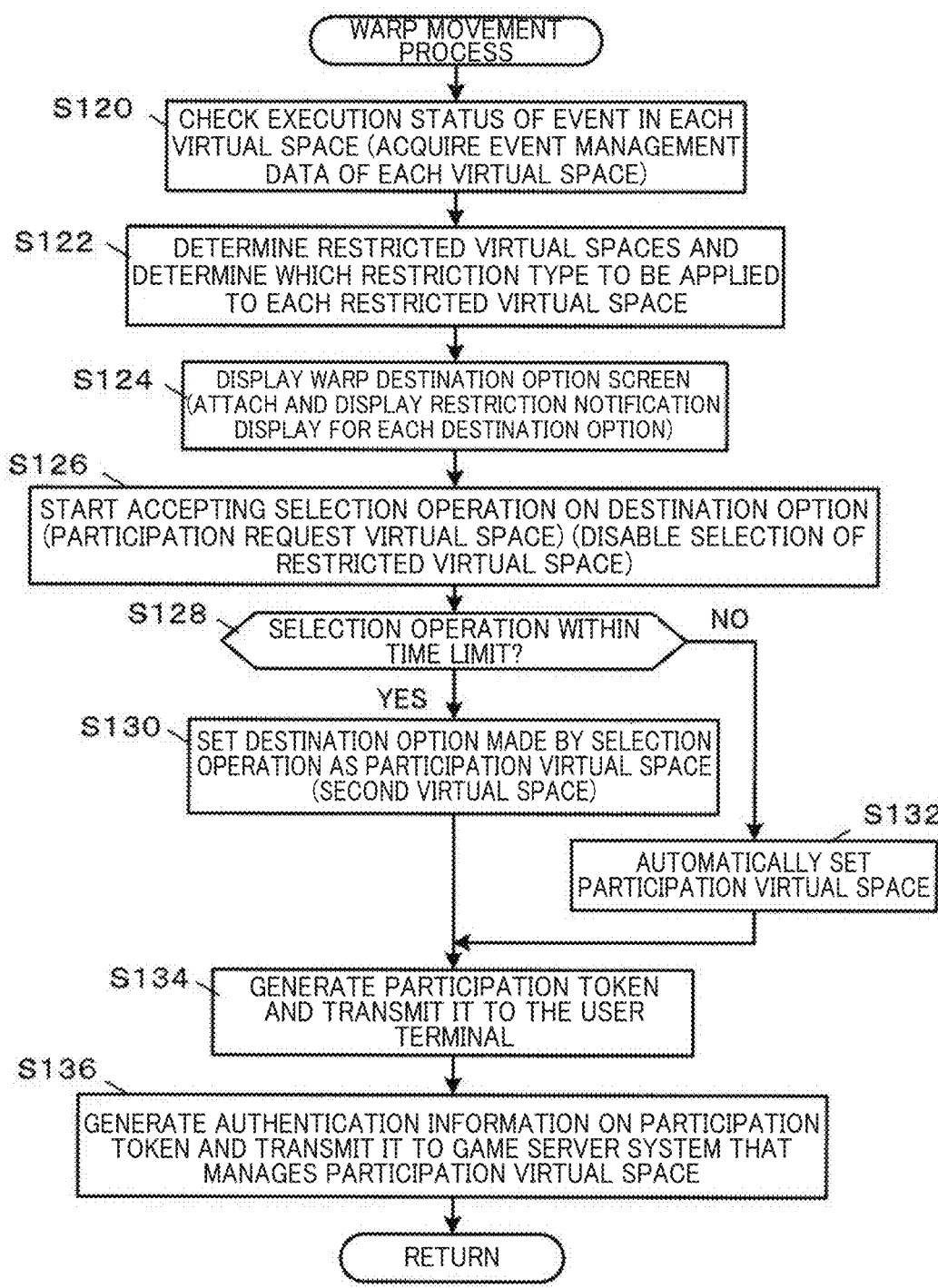

WARP MOVEMENT
PROCESS

S120 — CHECK EXECUTION STATUS OF EVENT IN EACH
VIRTUAL SPACE (ACQUIRE EVENT MANAGEMENT
DATA OF EACH VIRTUAL SPACE)

S122 — DETERMINE RESTRICTED VIRTUAL SPACES AND
DETERMINE WHICH RESTRICTION TYPE TO BE APPLIED
TO EACH RESTRICTED VIRTUAL SPACE

S124 — DISPLAY WARP DESTINATION OPTION SCREEN
(ATTACH AND DISPLAY RESTRICTION NOTIFICATION
DISPLAY FOR EACH DESTINATION OPTION)

S126 — START ACCEPTING SELECTION OPERATION ON DESTINATION OPTION
(PARTICIPATION REQUEST VIRTUAL SPACE) (DISABLE SELECTION OF
RESTRICTED VIRTUAL SPACE)

S128 — SELECTION OPERATION WITHIN
TIME LIMIT?          NO

YES

S130 — SET DESTINATION OPTION MADE BY SELECTION
OPERATION AS PARTICIPATION VIRTUAL SPACE
(SECOND VIRTUAL SPACE)

S132 — AUTOMATICALLY SET
PARTICIPATION VIRTUAL SPACE

S134 — GENERATE PARTICIPATION TOKEN
AND TRANSMIT IT TO THE USER
TERMINAL

S136 — GENERATE AUTHENTICATION INFORMATION ON PARTICIPATION
TOKEN AND TRANSMIT IT TO GAME SERVER SYSTEM THAT
MANAGES PARTICIPATION VIRTUAL SPACE

RETURN

COMPUTER SYSTEM, VIRTUAL SPACE CONTROL SYSTEM, AND VIRTUAL SPACE CONTROL METHOD

CROSS REFERENCE TO RELATED APPLICATIONS

This application is a continuation of International Patent Application No. PCT/JP2023/009093, having an international filing date of Mar. 9, 2023, which designated the United States, the entirety of which is incorporated herein by reference. Japanese Patent Application No. 2022-056819 filed on Mar. 30, 2022 is also incorporated herein by reference in its entirety.

BACKGROUND OF THE INVENTION

There is a known technique by which a virtual space (e.g., metaverse, game space in multiplayer online games, etc.) is constructed through a calculation process with a computer. In this technique, characters of users, or clients, (e.g., avatars, player characters, etc.; hereinafter referred to as "user characters") are arranged in this virtual space so that they can have virtual experiences. For example, Japanese Unexamined Patent Application Publication No. 2001-312744 discloses a technique by which users who share a single virtual space can communicate with one another.

For the case of a large number of users, the following system configuration is used: multiple server systems individually have data on respective virtual spaces and manage these virtual spaces; and user terminals (client terminals) used by the users are connected to those server systems in a distributed manner. Such system configurations are designed so that the process load on each server system is appropriately controlled. Thus, even a large number of users can enjoy their comfortable user experiences.

Japanese Unexamined Patent Application Publication No. 2010-213806 discloses a technique that enables a user to select, as a connection target, a server system that provides an appropriate spatial density for a user character in a virtual space. Specifically, each server system regarded as a selection candidate acquires density information on a user character in the virtual space (corresponding to the population density in the virtual world). Then, each server system notifies the user of the density information by using a bar graph, for example. The user can refer to this information and select the virtual space at the connection target.

There are cases, in a system that controls in parallel a plurality of virtual spaces that are set so as to have a common world view and that enables each user to change his/her participation virtual space, a user participates in different virtual spaces and disrupts a user experience of another user.

In the case of a massively multiplayer online role-playing game (MMORPG), for example, an occurrence of an event through which a rare item can be acquired may be managed in each of a plurality of virtual spaces. In such cases, if a user who has cleared an event and acquired a rare item in any virtual space wishes to acquire more rare items, he/she can move to another virtual space and clear the same event again to additionally acquire the same rare item. Depending on the content of the event, such repetitive involvement in the same event by the same user can be regarded as cheating, such as re-solving a problem for which the answer has already been known. This cheating action may reduce the excitement of another first-time player who would otherwise enjoy searching for a way to clear the event. In addition, a user who has cleared such an event may move to another virtual space and carelessly tell the solution to another user in a chat, for example. Such a "spoiling" action also corresponds to a case that hinders proper realization of the user experience.

Regardless of the content of the virtual experience, problems, as described above, may arise not in an MMORPG but also in any other system in which a plurality of virtual spaces set so as to have a common world view are present in parallel and each user can change his/her participation virtual space.

BRIEF DESCRIPTION OF THE DRAWINGS

FIG. 9 is a block diagram illustrating a functional configuration example of a portal server system.

FIG. 10 illustrates examples of programs and data stored in a storage section of the portal server system.

FIG. 11 is a diagram illustrating a data configuration example of user management data.

FIG. 12 is a block diagram illustrating a functional configuration example of a game server system.

FIG. 13 illustrates examples of programs and data stored in a storage section of the game server system.

FIG. 15 illustrates a data configuration example of participation restriction management data.

FIG. 17 is a flowchart of a flow of a system login process.

FIG. 20 is a flowchart of a flow of a warp movement process.

DETAILED DESCRIPTION

Figure 1:
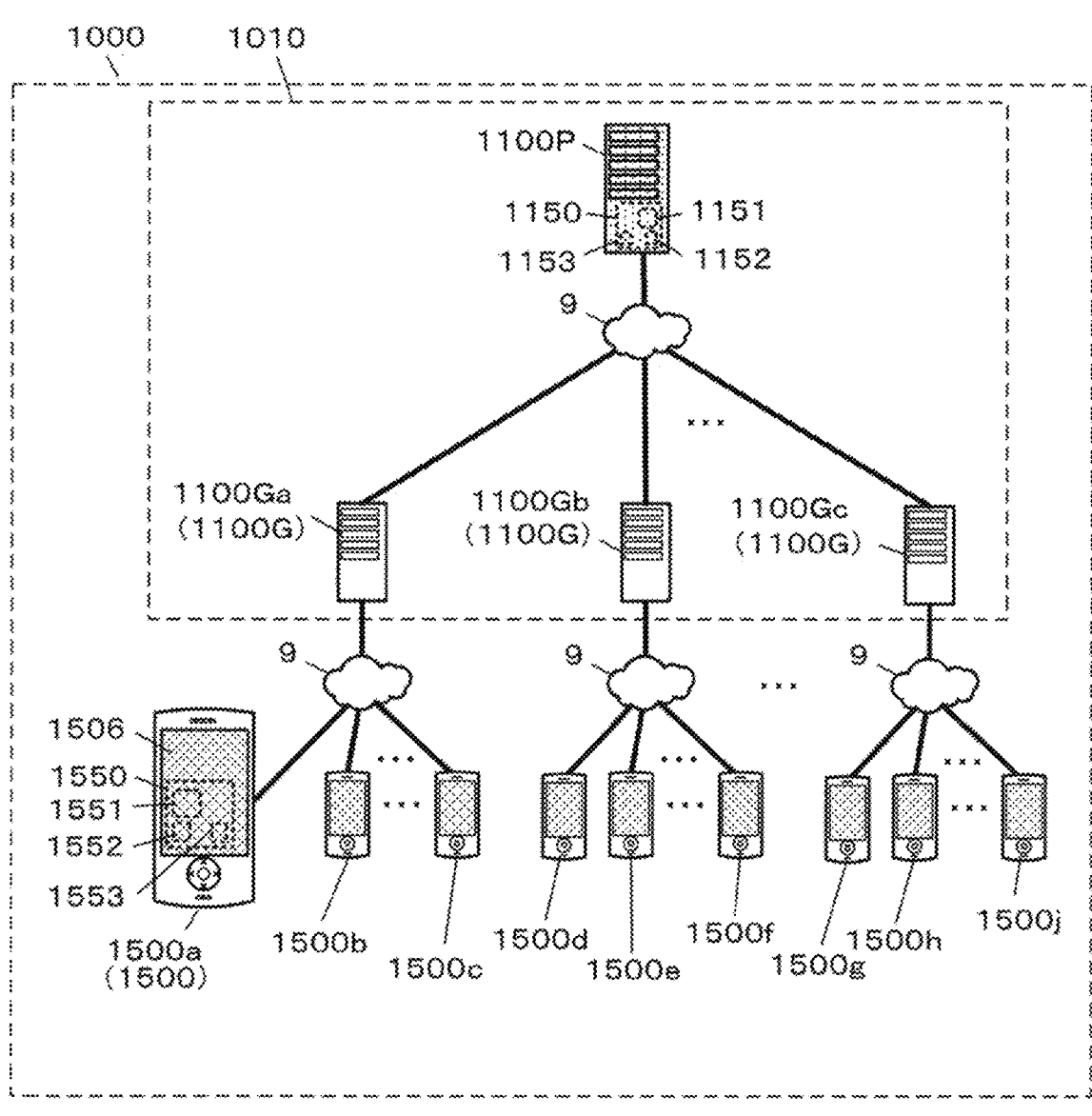
FIG. 1 is a diagram illustrating a configuration example of a virtual space control system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

A first disclosure is a computer system comprising at least one processor or circuit programmed to execute:

managing occurrence incidents for respective virtual spaces, the occurrence incidents being incidents that occur or that probably occur, the virtual spaces being set so as to have a common world view, being subjected in parallel to execution control, and allowing users to participate therein;

managing a participation record of a target user in a first virtual space; and managing a restriction on participation of the target user in any of virtual spaces other than the first virtual space, based on (a) a difference between a first occurrence incident being the occurrence incident in the first virtual space, and the occurrence incident in each of the virtual spaces other than the first virtual space, and (b) the participation record of the target user in the first virtual space.

A second disclosure is the computer system, wherein the managing a restriction includes determining whether each of the virtual spaces other than the first virtual space is a restricted virtual space, the restricted virtual space being a target for which participation of the target user is restricted, and managing the restriction on the target user in the restricted virtual space.

A third disclosure is the computer system, wherein the at least one processor or circuit is further programmed to execute selecting a second virtual space in which the target user participates, from among the virtual spaces other than the first virtual space, based on whether each of the virtual spaces is the restricted virtual space.

The "computer system" discussed herein may obviously include a single computer or alternatively may include a plurality of computers that operate together.

According to any of the disclosures, in some embodiments, the computer system can manage an occurrence incident for each virtual space and manage a users' participation record for each virtual space. The participation record also contains involvement records of the users in the occurrence incidents within the virtual spaces.

Based on the difference between the occurrence incident in the first virtual space and each of the occurrence incidents in virtual spaces other than the first virtual space and the users' participation record for the first virtual space, the computer system can determine whether the same user will repetitively get involved in the same occurrence incident within the virtual space of participation destination and then can restrict the change of the participation destination. In short, a system which controls in parallel a plurality of virtual spaces that are set so as to have a common world view and that enable each user to change his/her participation virtual space can reduce an action in which a user participates in different virtual spaces and disrupts a user experience of another user.

A fourth disclosure is the computer system, wherein the managing a restriction includes managing the restriction in the restricted virtual space by prohibiting the participation of the target user.

According to the disclosure, in some embodiments, the computer system can prohibit participation in a virtual space itself in which the same user may repetitively get involved in the same occurrence at the participation destination.

A fifth disclosure is the computer system as defined in claim 3, wherein the selecting a second virtual space includes accepting a participation request virtual space other than the first virtual space, based on a selection operation by the target user, and selecting the participation request virtual space as the second virtual space, when the participation request virtual space is not the restricted virtual space.

According to the disclosure, in some embodiments, the user can select his/her participation destination from among virtual spaces other than the restricted virtual space.

A sixth disclosure is the computer system, wherein the selecting a second virtual space includes presenting, to the target user, whether each of the virtual space other than the first virtual space is the restricted virtual space, and accepting a virtual space in which the target user requests participation as the second virtual space, from among the virtual spaces that are not the restricted virtual space, based on a selection operation by the target user.

According to the disclosure, in some embodiments, the computer system can provide the user with information regarding which of the virtual spaces is the restricted target virtual space, when a user selects his/her participation destination.

A seventh disclosure is the computer system, wherein the at least one processor or circuit is further programmed to execute selecting a second virtual space in which the target user participates, from among the virtual spaces other than the first virtual space, and wherein the managing a restriction includes performing an action restriction management by which the restriction on an action of the target user participating in the second virtual space is managed when the second virtual space is the restricted virtual space.

According to the disclosure, in some embodiments, the computer system can restrict his/her action in the second virtual space when a user participates in the second virtual space.

A eighth disclosure is the computer system, wherein the at least one processor or circuit is further programmed to execute predetermined special treatment control so that the target user or a character operated by the target user is treated specially in the second virtual space, based on the restriction managed by the action restriction management.

According to the disclosure, in some embodiments, the computer system can specially treat a user or a user's character which has changed his/her or its participation destination from the first virtual space to the second virtual space. For example, the special treatment is to restrict a user's action in the second virtual space or to set a display mode in the second virtual space to a special one indicating the user's character.

A ninth disclosure is the computer system as defined in claim 7, wherein the performing an action restriction management includes managing a restriction on the action of the target user involved in an incident that has already occurred in the first virtual space but have not yet occurred in the second virtual space, based on the first occurrence incident and a second occurrence incident being an occurrence incident in the second virtual space.

For example, if each occurrence incident is an event that requires participation registration, the "involved action" corresponds to a target user's registration to participate in this event. If the target user's character needs to approach or come into contact with an occurrence incident, the "involved action" corresponds to an operation input that achieves the approach or the contact or control of a character's action, such as approaching or coming into contact. If an occurrence incident is a raid, the "involved action" corresponds to an attack operation by the target user or an attack action toward the raid character by the target user.

According to the disclosure, in some embodiments, the computer system can restrict the involved action on an occurrence incidence that has already occurred in the first virtual space but has not yet occurred in the second virtual space. In short, even if the participation virtual space is changed to the second virtual space, the computer system restricts the involved action in the second virtual space, thereby successfully and substantially restricting the target user from repetitively getting involved in an occurrence incident (to get involved in an occurrence incident within the first virtual space and then also get involved it within the second virtual space).

A tenth disclosure is the computer system, wherein the at least one processor or circuit is further programmed to execute control so as to notify the target user that the action of the target user is to be restricted in the second virtual space before the target user participates in the second virtual space.

According to the disclosure, in some embodiments, before the target user participating in the first virtual space changes the participation virtual space to the second virtual space, the computer system can give, to the target user, information about the restriction on his/her action that will be applied after the change. In short, it is possible to help the target user to select the participation virtual space.

A eleventh disclosure is the computer system, wherein the selecting a second virtual space includes presenting, to the target user, whether each of the virtual space other than the first virtual space is the restricted virtual space, and selecting the second virtual space based on a selection operation by the target user.

According to the disclosure, in some embodiments, before the target user participating in the first virtual space changes the participation virtual space, the computer system can notify the target user which of virtual spaces other than the first virtual space is the restricted virtual space. In short, it is possible to help the target user to select the participation virtual space.

A twelfth disclosure is the computer system, wherein the selecting a second virtual space includes automatically selecting a second virtual space in which the target user participates and preferentially selecting a virtual space that is not the restricted virtual space.

According to the disclosure, in some embodiments, the computer system can preferentially and automatically select a virtual space with no restriction on him or her when the target user changes the participation virtual space. In short, it is possible to help the target user to select the participation virtual space.

A thirteenth disclosure is the computer system, wherein the managing a restriction includes determining that, of the virtual spaces other than the first virtual space, a virtual space in which an occurrence incident equivalent to the first occurrence incidence has not occurred is the restricted target virtual space.

According to the disclosure, in some embodiments, the computer system can set, to the restricted virtual space, a virtual space in which an occurrence incident equivalent to the first occurrence incident has not occurred. Therefore, the target user who has gotten involved in the first occurrence incident within the first virtual space is restricted from getting involved in an occurrence incident equivalent to the first occurrence incident within the second virtual space.

A fourteenth disclosure is the computer system as defined in claim 2, wherein the managing a restriction includes determining that, of the virtual spaces other than the first virtual space, a virtual space in which an occurrence incident equivalent to the first occurrence incident has not occurred and in which an occurrence incident in which the target user is determined to get involved in the first virtual space based on the participation record has not occurred is the restricted virtual space.

The "equivalent occurrence incidents" refers to, of events that have occurred in virtual spaces, ones that can be regarded as the same or substantially the same although some differences are found therebetween. For example, the equivalent occurrence incidents correspond to occurrence incidents with the same system identifications, with the same activation requirements, with the same scenario, or with the same initial setting information.

According to the disclosure, in some embodiments, the computer system can set, to the restricted virtual space, a virtual space in which an occurrence incident equivalent to the first occurrence incident in which the target user has already gotten involved has not occurred.

A fifteenth disclosure is the computer system as defined in claim 1, wherein the at least one processor or circuit is further programmed to perform asynchronous execution control of events in the plurality of virtual spaces, the events being identical to each other.

A sixteenth disclosure is the computer system as defined in claim 15, wherein the events include regular events and special events, the managing occurrence incidents includes managing the special events as the occurrence incidents.

According to the fifteenth or the sixteenth disclosure, the computer system can restrict the same target user from repetitively getting involved in events that can be executed asynchronously for respective virtual spaces, within different virtual spaces.

A seventeenth disclosure is the computer system as defined in claim 1, wherein each server includes a plurality of servers that control one or more of the virtual spaces.

According to the seventeenth disclosure, a computer system can be configured to prepare a plurality of servers, which manage at least one or more virtual spaces.

A eighteenth disclosure is a virtual space control system comprising:

a server system that is the computer system; and a user terminal that acts a man-machine interface for the users.

According to the eighteenth disclosure, it is possible to realize a virtual space control system that provides substantially the same effect as any of the first to seventeenth disclosures.

A nineteenth disclosure is a virtual space control method executed by a computer system, the method comprising:

managing occurrence incidents for respective virtual spaces, the occurrence incidents being incidents that occur or that probably occur, the virtual spaces being set so as to have a common world view, being subjected in parallel to execution control, and allowing users to participate therein;

managing a participation record of a target user in a first virtual space; and managing a restriction on participation of the target user in any of virtual spaces other than the first virtual space, based on (a) a difference between a first occurrence incident and the occurrence incident in each of the virtual spaces other than the first virtual space, and (b)

the participation record of the target user in the first virtual space, the first occurrence incident being the occurrence incident in the first virtual space.

According to the nineteenth disclosure, it is possible to realize a virtual space control method that provides substantially the same function and effect as the first disclosure.

Exemplary embodiments are described below. Note that the following exemplary embodiments do not in any way limit the scope of the content defined by the claims laid out herein. Note also that all of the elements described in the present embodiment should not necessarily be taken as essential elements Some examples of embodiments of the disclosure will be described below; however, it is obvious that forms to which the disclosure is applicable are not limited to the following embodiments.

FIG. 1 is a diagram illustrating a configuration example of a virtual space control system 1000.

The virtual space control system 1000 is a system that simultaneously provides many users with virtual experiences in virtual spaces. The virtual space control system 1000 is a computer system that includes an operation system 1010 and user terminals 1500 (1500a, 1500b, . . . ) for the respective users, each of which is connected to operation system 1010 so as to make data communication possible via one or more networks 9. Each user terminal 1500 is a man-machine interface (MMIF).

The virtual space control system 1000 provides various types of virtual experience services in three-dimensional virtual spaces. Hereinafter, an example of providing online games will be described as one of the virtual experience services; however, contents of the virtual experience services are not limited to this example.

Each network 9 refers to a communication channel that makes data communication possible. Specifically, examples of the networks 9 include a telecommunication network, a cable network, and the Internet, in addition to a private line (a private cable) for direct connecting and a local area network (LAN) based on Ethernet (registered trademark).

The operation system 1010 is a computer system to be managed and operated by a service provider or a system operator. In addition, the operation system 1010 is a server system that includes a portal server system 1100P and a plurality of game server systems 1100G (1100Ga, 1100Gb, . . . ). The portal server system 1100P and the game server systems 1100G (1100Ga, 1100Gb, . . . ) are connected to each other via a network 9 so as to make data communication possible. In addition, each of the game server systems 1100G (1100Ga, 1100Gb, . . . ) is connected to user terminals 1500 via a network 9 so as to make data communication possible.

The portal server system 1100P is a server system which the user terminals 1500 first access in order to utilize various types of services related to the virtual space control system 1000. The portal server system 1100P performs functions related to, for example, user registration, management of online sales of various items and other items available in the virtual space, and allocation of users to game servers after login.

Each of the game server systems 1100G (1100Ga, 1100Gb, . . . ) communicates with one or more of the user terminals 1500 and functions as a game server in which the user terminals 1500 are used as game clients.

Basic functions of computer systems in the portal server system 1100P and the game server system 1100G can be realized likewise.

Specifically, each of the server system 1100P and the game server systems 1100G includes a main body device, a keyboard, and a touch panel. In addition, a control board 1150 is mounted in the main body device. In the control board 1150, various types of microprocessors such as a central processing unit (CPU) 1151, a graphics processing unit (GPU), and a digital signal processor (DSP), various types of integrated circuit (IC) memories 1152 such as a video random access memory (VRAM), a random access memory (RAM), and a read-only memory (ROM), and a communication device 1153 are mounted. It should be noted that a part or whole of the control board 1150 may be implemented by an application-specific integrated circuit (ASIC), a field-programmable gate array (FPGA), or a system on a chip (SoC).

The control board 1150 in each of the portal server system 1100P and the game server systems 1100G performs a calculation process, based on a predetermined program and predetermined data, so that the portal server system 1100P and each game server system 1100G can realize different functions.

It should be noted that each of the portal server system 1100P and the game server systems 1100G is illustrated in FIG. 1 as if each of them were a single server device; however, each of them may be implemented by a plurality of devices. For example, each of the portal server system 1100P and the game server system 1100G may be configured such that a plurality of blade servers having individual functions are connected to each other via an internal bus so as to make data communication possible. Furthermore, the hardware parts that constitute the portal server system 1100P and the game server systems 1100G may be installed at any sites. A plurality of independent servers installed at remote sites may perform data communication via the networks 9, thereby functioning as the operation system 1010 on the whole.

Each user terminal 1500 is a computer system to be used by a user to utilize the virtual space control system 1000. Each user terminal 1500 functions as a man-machine interface (MMIF) in the virtual space control system 1000.

Each user terminal 1500 is illustrated as a device called a smartphone in FIG. 1; however, each user terminal 1500 may be any computer system, such as a wearable computer, a portable game device, a consumer game device, a tablet computer, or a personal computer. If a plurality of electronic devices, such as a combination of a smartphone, a smartwatch that can establish a communication connection with the smartphone, and a head-mounted display, for example, are communicably connected to each other to perform a single function, the plurality of electronic devices may be regarded as a single user terminal 1500.

Each user terminal 1500 includes an operation input device (e.g., a touch panel 1506, a keyboard, a game controller, or a mouse), an image display device (e.g., the touch panel 1506, a head-mounted display, or a glasses type display), and a control board 1550.

The control board 1550 includes, for example, a CPU 1551, various types of microprocessors such as a GPU and a DSP, various types of IC memories 1552 such as a VRAM, a RAM, and a ROM, and a communication module 1553 connected to a corresponding network 9. These elements mounted in the control board 1550 are electrically connected together via a bus circuit, for example, to read/write data and transmit/receive signals. A part or whole of the control board 1550 may be implemented by an ASIC, an FPGA, or an SoC. The control board 1550 stores, in the IC memory 1552, programs and various types of data for use in implementing a function of a user terminal. Then, the user terminal 1500 executes a predetermined application program to realize a function of a man-machine interface (MMIF) or a game client in the virtual space control system 1000.

Each user terminal 1500 is configured to download, from the portal server system 1100P, an application program and various types of data necessary for executing the application program; alternatively, each user terminal 1500 may be configured to read the application program and the data necessary from a storage medium, such as a memory card, that has been acquired by the user.

Figure 2:
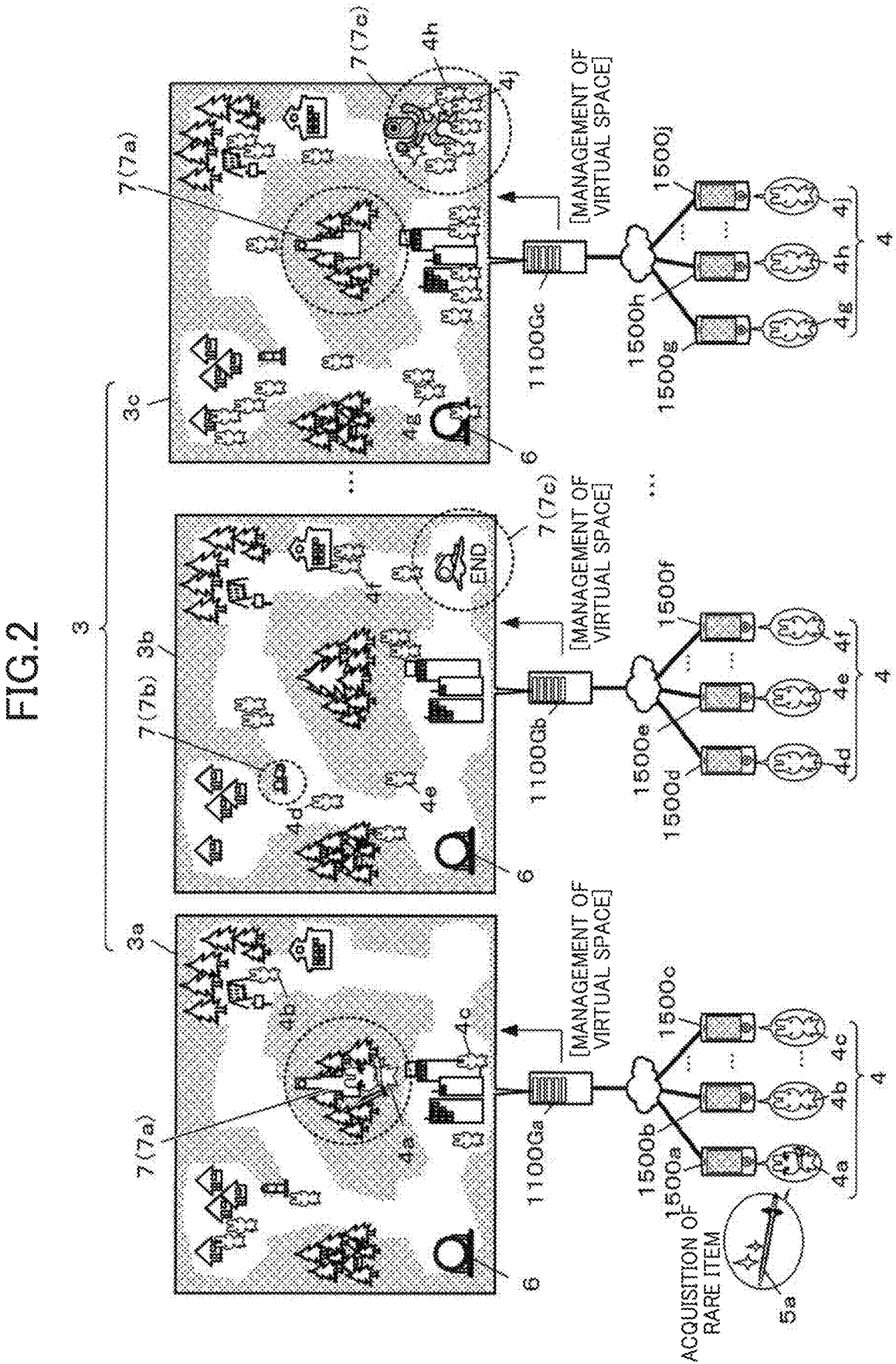
FIG. 2 is a diagram illustrating virtual spaces provided by the virtual space control system.

FIG. 2 is a diagram illustrating virtual spaces 3 to be provided by the virtual space control system 1000. Each virtual space 3 is set so as to provide a three-dimensional virtual world that represents a common world view (common game world) for all users. Each virtual space 3 has a different space and time flow from reality, continues to exist as data in the virtual space control system 1000 even when no users login, and is controlled so that time continues to pass and change in the virtual space as time passes in the real world.

The virtual spaces 3 include a plurality of virtual spaces 3 (3a, 3b, . . . ) that exist concurrently.

Each of the game server systems 1100G (1100Ga, 1100Gb, . . . ) stores and manages data for at least one of the virtual spaces 3 (3a, 3b, . . . ). Although each of the virtual spaces 3 (3a, 3b, . . . ) has an independent entity as data, the size of the virtual spaces 3, the structure of the virtual spaces 3, and the position coordinate systems described by each virtual space 3 and rules applied thereto are the same as one another and share a common world view.

A user operates his/her user terminal 1500 to connect to the portal server system 1100P and then performs a system login to make the virtual space control system 1000 available. After the system login, the user performs a play login to any of the game server systems 1100G (1100Ga, 1100Gb, . . . ) that enable gameplay in order to participate in the virtual space 3 of the game server system 1100G for making gameplay possible.

The game server system 1100G places a user character 4 (4a, 4b, . . . ) of the user terminal 1500 that has performed the play login, in any of the virtual spaces 3 (3a, 3b, . . . ) managed by the game server system 1100G. Then, the game server system 1100G controls an action of the user character 4 in the virtual space 3 in accordance with a user's operation input and, as a result of this action, causes an object constituting the virtual space 3 (3a, 3b, . . . ) to appear, move, change its form, or disappear, thereby changing the virtual space 3. In short, the user can participate, as the user character 4, in any of the virtual spaces 3 managed by the game server system 1100G to which he/she has performed play-login by using the user terminal 1500 and enjoy a virtual experience (MMORPG in the present embodiment) in the virtual space 3.

The times in the respective virtual spaces 3 are managed independently.

For example, the time of a game server system 1100G is managed based on the time in the real world at the site where the game server system 1100G is installed. As a result, of the times in the virtual world of the plurality of virtual spaces 3 (3a, 3b, . . . ), some may be the same but others may be different.

Each virtual space 3 is provided with a warp gate 6.

The warp gate 6 is a game facility that allows the user character 4 to move to another virtual space 3 when a user character 4 enters the warp gate 6. In short, the warp gate 6 is a virtual interface for using a mechanism to switch between the virtual spaces 3 (participation virtual spaces) in which the user participates in an online game.

Specifically, when a user character 4 enters a warp gate 6, the participation of the user terminal 1500 of the user character 4 in the virtual space 3 with the warp gate 6 is terminated. Then, the participation in the virtual space 3 at the destination starts. In this system, the connection between the user terminal 1500 and the game server system 1100G that manages the virtual space 3 with the warp gate 6 is terminated. Then, a new connection between the user terminal 1500 and the game server system 1100G that manages the virtual space 3 at the destination starts. In this case, the user can see as if the gameplay were continued on a game screen of the user terminal 1500.

The game server systems 1100G cause various events 7 (7a, 7b, . . . ) to independently occur in accordance with times of days and states of the respective virtual spaces 3 and then manage and control their progress.

Each of the events 7 (7a, 7b, . . . ) is an incident that is prepared to provide a virtual experience and is tailored to occur in a corresponding virtual space 3. In the virtual space 3a, as illustrated in FIG. 2, for example, a tower event 7a in which a mysterious tower-shaped dungeon will appear has occurred and is currently in progress. In response, the user character 4a clears this event and then acquires a rare item 5a. In the virtual space 3c, the tower event 7a has been terminated, but a raid event 7c has occurred and is currently in progress. In the virtual space 3b, the tower event 7a has not yet occurred, but the raid event 7c has already been terminated. In addition, an incident event 7b in which a ruin will be destroyed has occurred and is currently in progress.

Figure 3A:
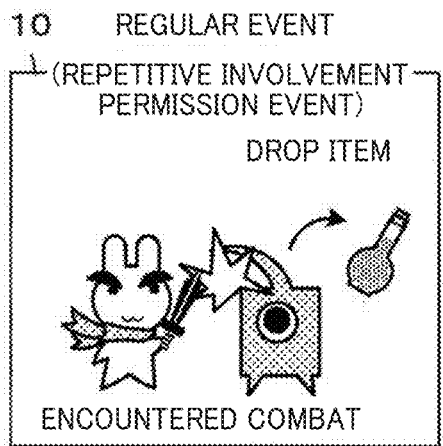
FIG. 3A is a diagram illustrating classification of events.
Figure 3B:
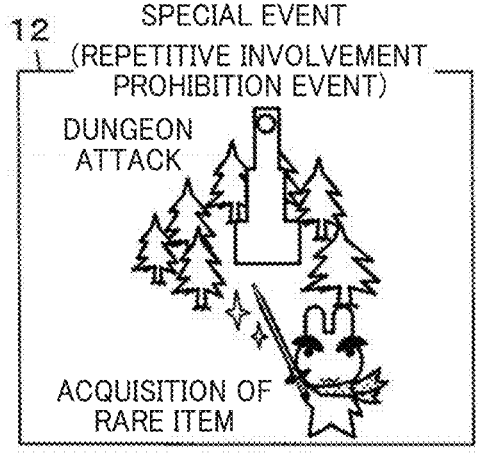
FIG. 3B is another diagram illustrating classification of events.

FIGS. 3A and 3B each illustrate classification of the events 7 that is to occur in the virtual spaces 3 (3a, 3b, . . . ). The events 7 are broadly divided into regular events 10 and special events 12.

A regular event 10 is a normal, typical event that is to occur with high frequency in online games, as in an example illustrated in FIG. 3A. Examples of such regular events include a battle event in which a user character 4 encounters an enemy character, an item acquisition event in which a user character 4 solves a riddle and acquires an item, a conversation event with a non-player character (NPC) that is a resident in a virtual world, and a mini-game event in which a user plays a game in a virtual world. The regular event 10 is also a "repetitive involvement permission event", in which a user character 4 is permitted to get involved multiple times due to a nature of an incident that occurs in relation to the regular event 10 and a prize (e.g., experience value, skill, dropped item, etc.) acquired by the user character 4 as a result of this incident.

A special event 12 is an event that occurs under a special condition in an online game, as in an example illustrated in FIG. 3B. Examples of such special events 12 include the tower event 7a, the incident event 7b, and the raid event 7c, which have been illustrated above. Examples of such special events 12 further include an event that may give a rare item or a rare skill to a user character 4, an event that allows a user character 4 to acquire large amounts of experience value, and other events with content that makes the involved user character 4 advantageous (or in some cases disadvantageous). In short, a special event 12 is a "repetitive involvement prohibition event", which is regarded as being undesirable to get involved multiple times due to natures of a content that happens in the special event 12 and a reward that a user character 4 acquires as a result of this content.

If the same user is permitted to repetitively get involved in a special event 12, an "event trolling" or "spoiling" action may occur.

For example, if there is a special event through which a rare item can be acquired, there are cases a certain user acquires the rare item, then use a warp gate 6 to move to another virtual space 3, and clears the same special event again to acquire an additional rare item. If a user moves to and participates in different virtual spaces 3 in order to repetitively get involved in an event, he/she would clear this event in the shortest time, because he or she already knows how to clear that event. Basically, there should be a difficult process to clear the event, but he/she can skip this process. In this case, if another player participates in this event for the first time, he/she will see that the user who has moved from another virtual space 3 in order to repetitively get involved in this event easily clears the event in front. This means that the other player who sees the game for the first time is deprived of the difficult process that he/she would otherwise enjoy. This action can be an "event trolling" action. Another potential problem is "spoiling" action, in which a user carelessly tells another user about how to clear an event in a chat room, for example. The "event trolling" and "spoiling" actions are extremely annoying to other users.

The virtual space control system 1000 in the present embodiment incorporates a mechanism to restrict "event trolling" and "spoiling" actions. The virtual space control system 1000 performs one or more of the following restriction mechanisms: (1) restricting participation in a virtual space 3; (2) restricting an action of a user character 4 in the virtual space 3 after participation in a virtual space 3; and (3) restricting information in order to prevent leakage of information related to a repetitive involvement prohibition event in a virtual space 3 at a destination.

Figure 4:
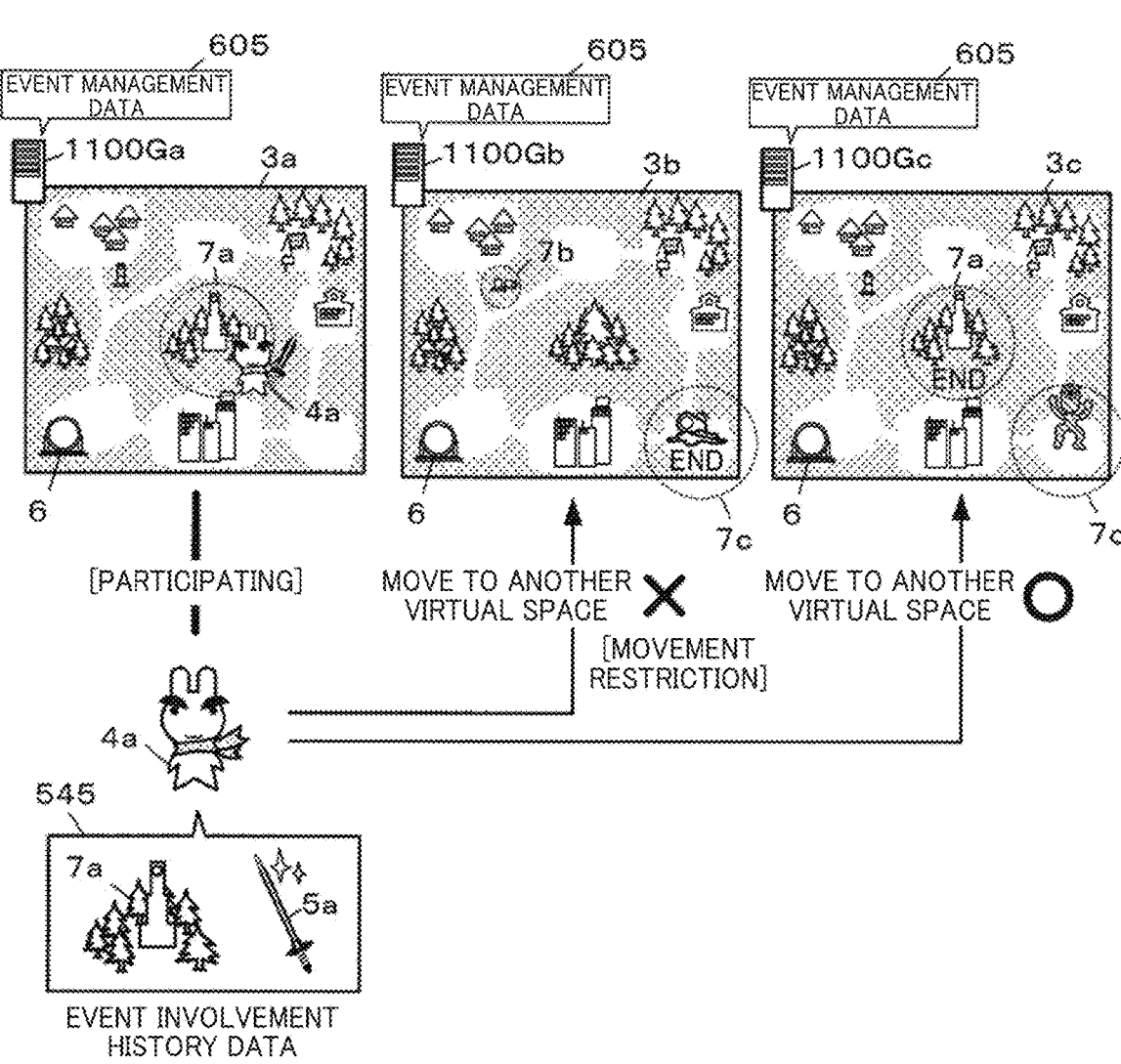
FIG. 4 is a diagram illustrating a participation restriction.

FIG. 4 illustrates the participation restriction.

The game server systems 1100G, which manage virtual spaces 3 (3a, 3b, . . . ), stores and manages respective pieces of event management data 605 (see FIG. 13), which are used to manage states of events that have occurred in the virtual spaces 3 and are managed by the game server systems 1100G. The portal server system 1100P also stores and manages, for each user character 4, event involvement history data 545 (see FIG. 11) regarding events each user character 4 has gotten involved in and experienced.

If the user character 4a participating in the virtual space 3a clears the tower event 7a being currently in progress and acquires the rare item 5a, for example, as in FIG. 4, the "clearing of the tower event 7a and acquiring of the rare item 5a" is stored and managed as the event involvement history data 545 for the user character 4a.

When the user character 4a changes the participation virtual space via the warp gates 6, as illustrated in FIG. 4, the event management data 605 for each virtual space 3 and the event involvement history data 545 for the user character 4a are referenced. Then, the virtual space 3b, in which events the user character 4a has already gotten involved in (experienced events; the tower event 7a in the example in FIG. 4) have not yet occurred is recognized as a restricted virtual space. In this case, the user character 4a is prohibited from participating in this space. The user character 4a is permitted to participate in the virtual space 3c, in which the involved event has already occurred and been terminated. In short, the user character 4a is restricted to participate in a virtual space 3 in which the user character 4a can repetitively get involved in an event.

These participation restrictions are applied to cases where the user of the user character 4a changes the participation virtual space from the current participation virtual space 3 to another virtual space 3 via the warp gates 6 and where the user determines in which virtual space it will participate first after the system login. If participation virtual space is determined after the system login, based on the assumption of the state of each virtual space 3 illustrated in FIG. 4, the user character 4a is permitted to participate (play login) in both the virtual space 3a and the virtual space 3c but prohibited from participating in the virtual space 3b.

Figure 5:
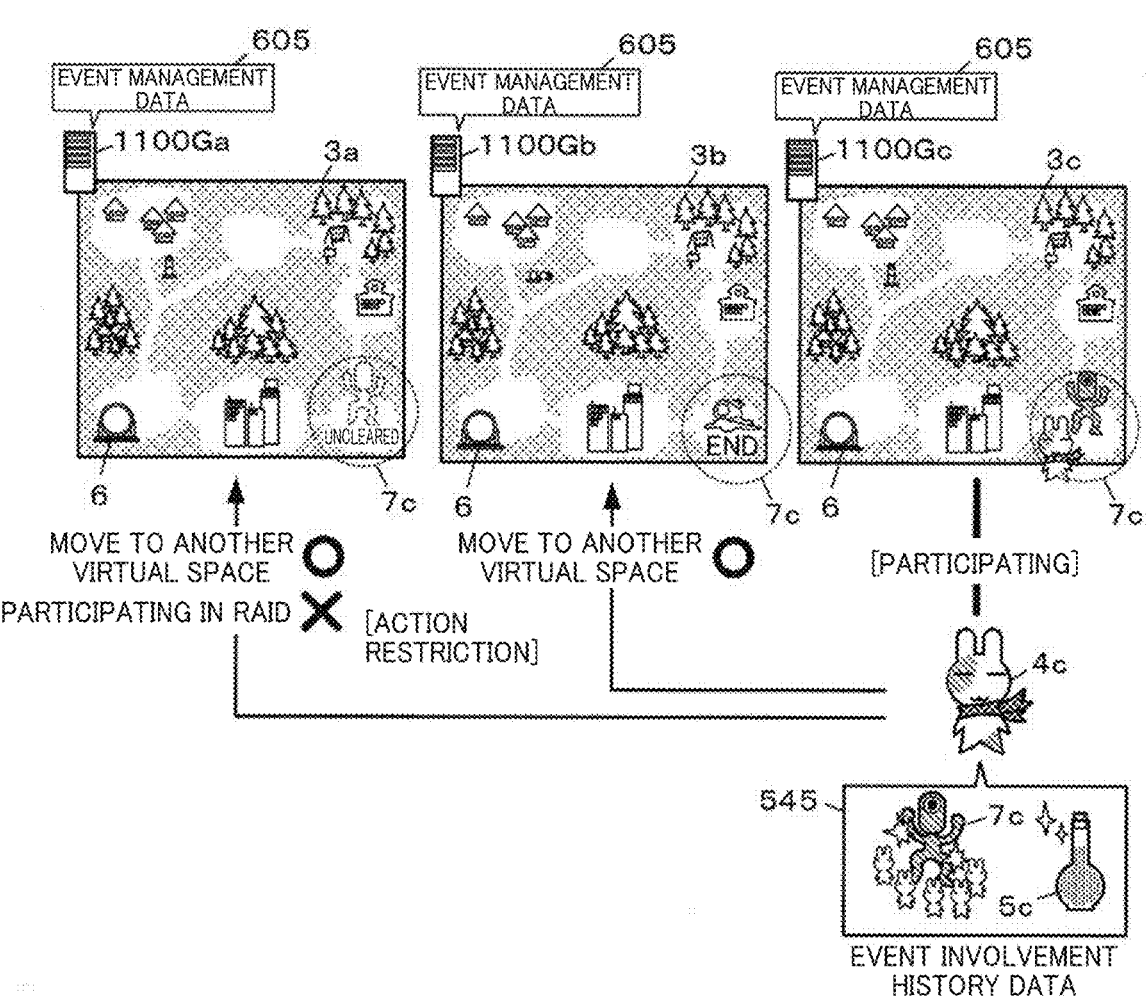
FIG. 5 is a diagram illustrating an action restriction.

FIG. 5 illustrates the action restriction.

If the user character 4c participating in the virtual space 3c clears the raid event 7c and acquires the rare item 5c, for example, the "clearing of the raid event 7c and acquiring of the rare item 5c" is stored and managed as the event involvement history data 545 for the user character 4c.

When the user character 4c changes the participation virtual space via the warp gates 6, the event management data 605 for each virtual space 3 and the event involvement history data 545 for the user character 4c are referenced. Then, the user character 4c can move to either the virtual space 3a or the virtual space 3b; however, when participating in the virtual space 3a in which an event the user character 4 has already gotten involved in (experienced event; the raid event 7c in the example in FIG. 5) has not yet occurred, his/her participation is permitted but the action after the participation is restricted. Specifically, the "involved action", which refers to an action of getting involved in an occurrence of the same event as an already involved event in the virtual space 3a, is restricted.

As to an example of the action restriction regarding the "involved action", if activating a mechanism is a requirement for the raid event 7c to occur at a ruin, the user character 4c is prohibited from activating this mechanism. Other examples include: (a) prohibiting the user character 4c from approaching an event area so that, even if the raid event 7c occurs, the user character 4c cannot approach the event area within a predetermined distance (substantially prohibiting the involvement in the event); (b) prohibiting registration procedures for the participation in the raid event 7c; and (c) prohibiting an attack action against enemy character present in the raid event 7c. The types of action restrictions other than these actions can be set as appropriate depending on that event.

Figure 6:
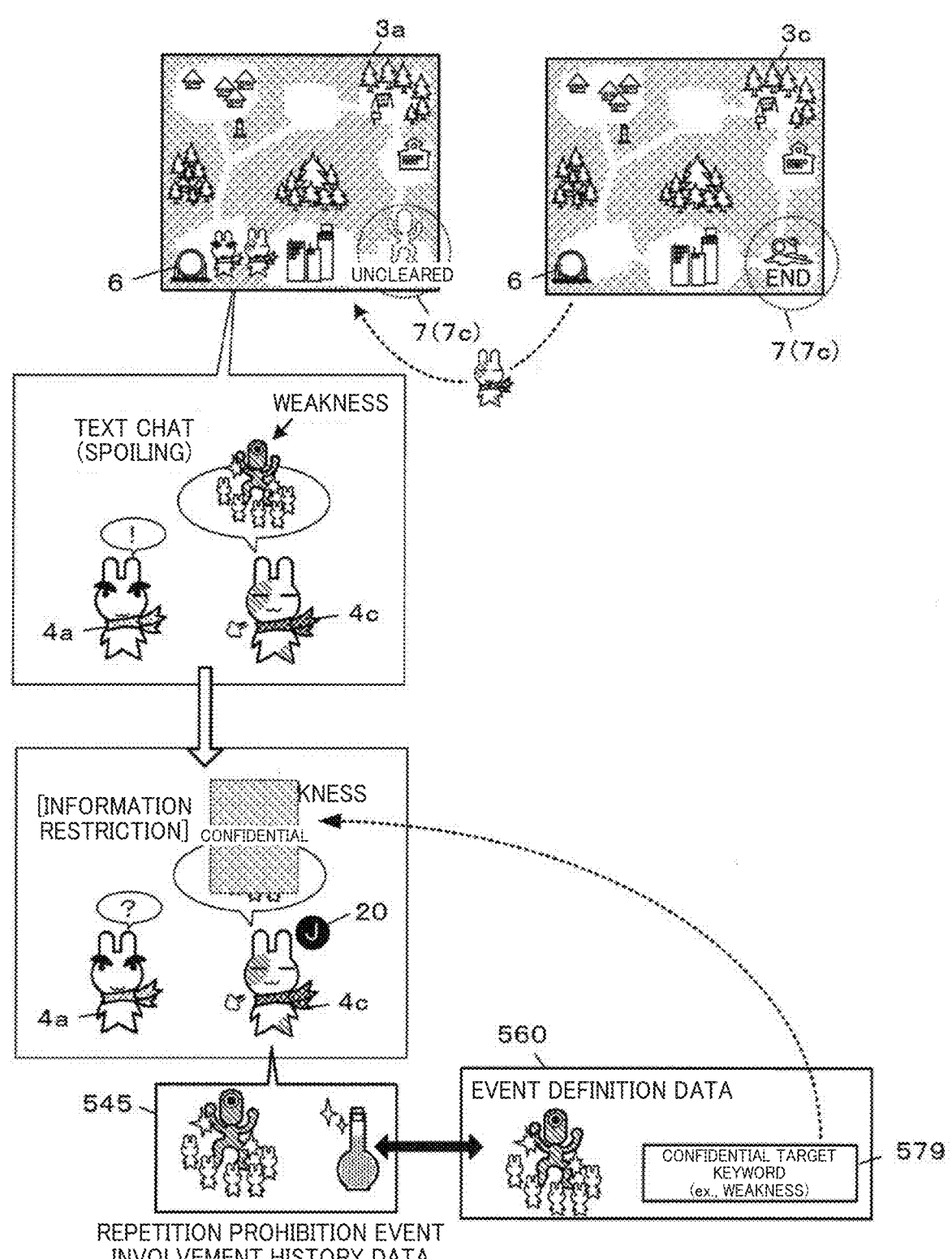
FIG. 6 is a diagram illustrating an information restriction.

FIG. 6 illustrates the information restriction.

After having moved from the virtual space 3c to the virtual space 3a via the warp gates 6, the user character 4c is having a text chat with the user character 4a (see the balloon in FIG. 6). During this chat, the user character 4c is talking about the raid event 7c in which it got involved (experienced) within the virtual space 3c before the movement. For example, the user character 4c is talking about various information about the movement and weakness of the raid boss. In short, the user character 4c is taking the "spoiling" action about the raid event 7c.

In the event definition data 570 for each event 7, a confidential target keyword 579, which is a piece of information about each event 7 which is to be kept secret (not to be spoiled), is defined. When a user character 4c that has moved from the virtual space 3c has a text chat, the game server system 1100G subjects a text message in the chat to a concealing process if the text sentence contains the confidential target keyword 579. For example, by replacing the text with symbolic text, by setting the transparency of the text to 100%, by setting the display color of the text to the same color as the background color of the chat display area, or by setting the font size of the text to "0" or its equivalent, the confidential target keyword 579 can be prevented from being recognized by the party in the chat.

The user character 4c that has moved from the virtual space 3c is additionally indicated by an identification marker 20 displayed in the virtual space 3a at the destination, so that the user character 4c can be identified as a character moved from another virtual space. By changing the display mode of the user character 4c, the user character 4c is treated specially. The user of the user character 4a who has recognized the identification marker 20 can consider the risk of "spoiling" happening through the chat with the user character 4c. A user who has become aware of the risk of "spoiling" can avoid it by avoiding chatting with the user character 4c or by cutting it off at an appropriate time.

Figure 7:
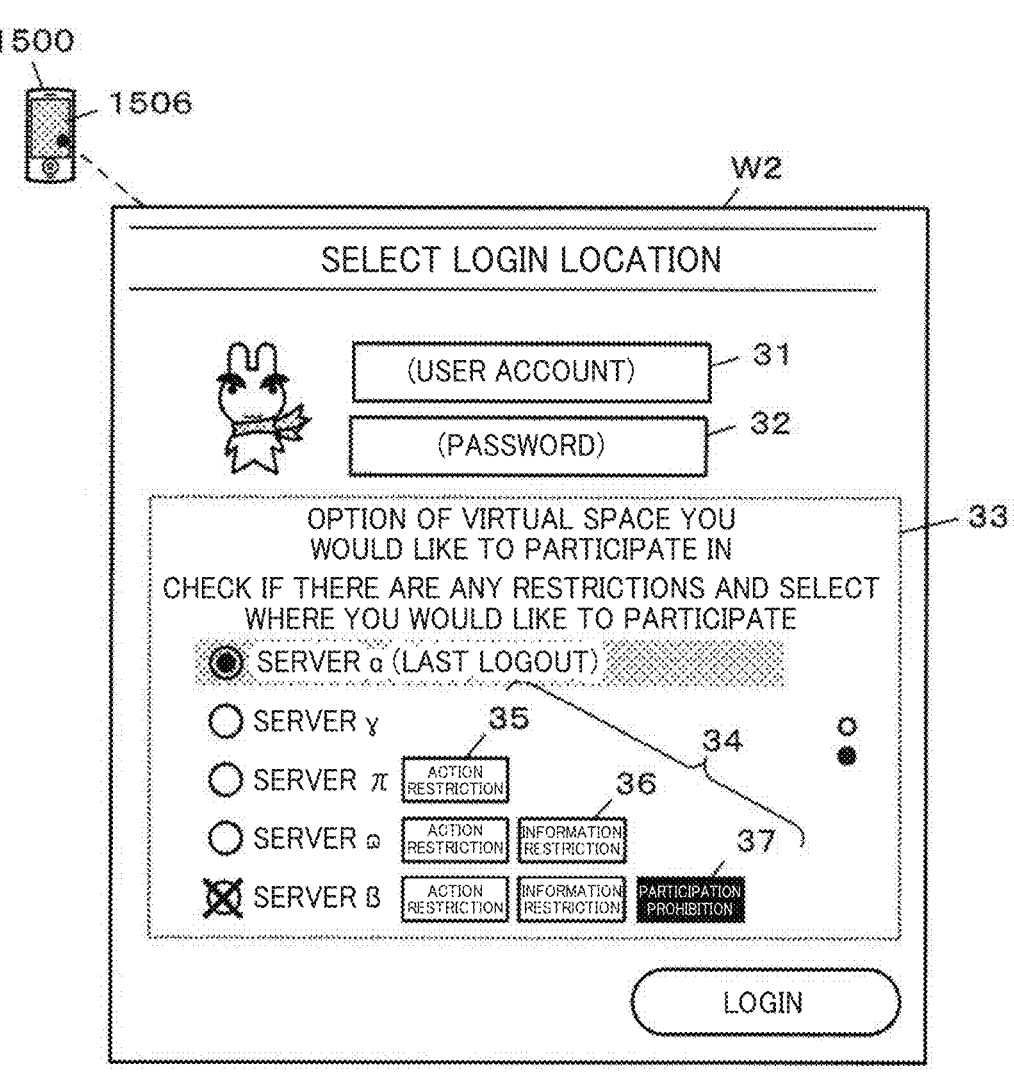
FIG. 7 is a diagram illustrating a display example of a system login screen and others.

FIG. 7 is a diagram illustrating an example of a display of a system login screen and others.

When attempting to use the virtual space control system 1000, a user connects the user terminal 1500 to the portal server system 1100P and performs the system login. In this case, a system login screen W2 is displayed at the user terminal 1500 and contains a user account input section 31, a password input section 32, and a participation request option display 33.

After the system login, the participation request option display 33 presents, as options, the user with some game server systems 1100G to which the user terminal 1500 can be connected and accepts a selection operation by which the user can select any of the game server systems 1100G.

Together with the options displayed in the participation request option display 33, a restriction notification display 34 (an action restriction notification display 35, an information restriction notification display 36, and a participation restriction notification display 37) is attached and displayed to notify restrictions applied to the virtual space 3 managed by the game server system 1100G.

The portal server system 1100P sets the restrictions applied to the virtual spaces 3 by acquiring, from the game server systems 1100G, information about the execution statuses of the special events 12 (repetitive involvement prohibition events) in the virtual spaces 3 managed thereby and by referring to the event involvement history data 545 and the definition data for each event stored in relation with the user who requests the system login. Then, if the execution status of an event that is the same as the special event 12 in which the user has already gotten involved in the virtual space 3 of a certain option satisfies the requirement for applying the participation restriction (participation restriction application requirement; e.g., this even has not occurred or has occurred but not been cleared, etc.), the portal server system 1100P determines that the participation restriction is applied to the virtual space 3. If the application of the action restriction is specified for an event that is the same as the special event 12 in which the user has already gotten involved, the portal server system 1100P determines that the action restriction and the information restriction are applied to the virtual space 3. The attachment of the restriction notification display 34 represents the result of this determination.

Each of the action restriction notification display 35 and the information restriction notification display 36 may also serve as a detailed display operation icon. Specifically, in response to user's selection operation on the restriction notification indication 34, detailed information about the content of the restriction related to the type of the restriction notification display 34 preferably pops up; for example, when the action restriction notification display 35 is operated, detailed information, such as that about what action restriction is to be applied to which event, preferably pops up.

The option related to the virtual space 3 to which the participation restriction is applied (the option to which the participation restriction notification display 37 is attached; "server β" in the example in FIG. 7) is presented in the participation request option display 33 but is treated so that the user cannot select or operate it.

The portal server system 1100P sets the virtual space 3 (the virtual space 3 managed by the game server system 1100G which is referred to as "server α" in the example in FIG. 7) related to the selection made by the user through the participation request option display 33 as participation virtual space in which the user participates for the first time after the system login. For this user, the virtual space 3 in which he/she last participated is defined as a "first virtual space", whereas the virtual space 3 in which he/she first participates after the system login is defined as a "second virtual space". When the user performs the system login again after having performed the system logout, if the user re-participates the virtual space 3 in which he/she was participating at the time of system logout, the first virtual space coincides with the second virtual space.

The participation restriction related to the system login excludes the virtual space 3 in which the user performed the system logout when he/she last played (the virtual space 3 in which the user last played). The example in FIG. 7 illustrates that the virtual space 3 managed by "server α" corresponds to the virtual space 3 that the user last played.

Figure 8:
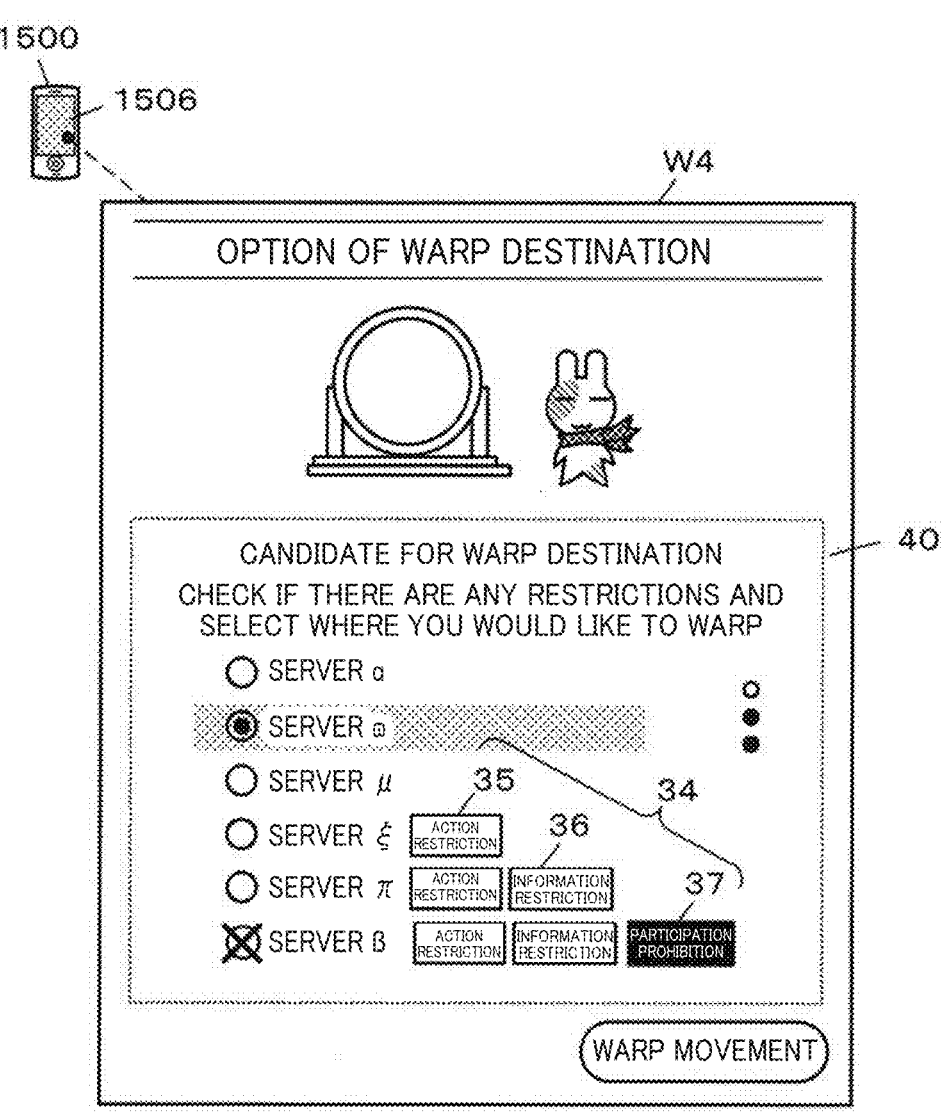
FIG. 8 is a diagram illustrating a display example of a warp destination option screen.

FIG. 8 illustrates an example of a display of a warp destination option screen W4 appearing when a user character 4 moves from a virtual space 3 in which he/she is currently participating to another virtual space 3 via the warp gates 6.

On the user terminal 1500 of a user who causes the user character 4 to enter into a warp gate 6, the warp destination option screen W4 is displayed for selecting to which of the virtual spaces the participation virtual space is to be changed and to which of the virtual spaces 3 the user character 4 is to be moved.

The warp destination option screen W4 contains a destination option display 40.

The destination option display 40 presents the game server systems 1100G that manage the virtual spaces 3 to which the user character 4 can move, to the user as options and then accepts a selection operation by which the user selects any of the virtual spaces 3.

Together with the options displayed on the destination option display 40, the restriction notification display 34 (the action restriction notification display 35, the information restriction notification display 36, and the participation restriction notification display 37) that informs the user of restrictions to be applied to the virtual spaces 3 managed by the selected game server systems 1100G is displayed. In this case, an option related to the virtual space 3 to which the participation restriction is applied (the option to which the participation restriction notification display 37 is attached; "server β" in the example in FIG. 8) is presented in the destination option display 40, but the user is treated so that he/she cannot operate or select it.

The game server system 1100G sets the virtual space 3 (the virtual space 3 managed by the game server system 1100G, which is called "server w" in the example in FIG. 8) related to the selection made by the user through the destination option display 40, as a virtual space at a destination, or a next participation virtual space, to which the user character 4 will move. For this user, the virtual space 3 in which he/she last participated corresponds to the "first virtual space", whereas the next participation virtual space 3 corresponds to the "second virtual space".

Next, a functional configuration will be described herein.

FIG. 9 is a block diagram illustrating a functional configuration example of the portal server system 1100P.

The portal server system 1100P includes an operation input section 100p, a processing section 200p, a sound output section 390p, an image display section 392p, a communication section 394p, and a storage section 500p.

The operation input section 100p is a means for inputting various types of operations by which each portal server system 1100P is to be managed. For example, the operation input section 100p corresponds to a keyboard, a touch panel, or a mouse.

The processing section 200p is implemented, for example, by a processor serving as an arithmetic circuit such as a CPU, a GPU, an ASIC, or an FPGA and an electronic component such as an IC memory and performs input-and-output control of data among functional sections including the operation input section 100p and the storage section 500p. In addition, the processing section 200p comprehensively controls operation of the portal server system 1100P by executing various types of calculation processes based on a predetermined program and data, an operation input signal from the operation input section 100p, or data received from the user terminals 1500 and the game server systems 1100G (1100Ga, 1100Gb, . . . ), for example.

The processing section 200p includes a user management section 202, a system login management section 210, a timer section 280p, a sound generation section 290p, an image generation section 292p, and a communication control section 294p. Obviously, the processing section 200p may further include any other functional section as appropriate.

The user management section 202 performs a process related to user registration procedures and stores and manages various types of information associated with user accounts.

The user management section 202 includes participation record management section 204, which manages a record of users' participation in the virtual spaces 3 related to the use of the virtual space control system 1000, in relation to their user accounts. This participation record contains the event involvement history data 545 regarding incidents that the users have caused in their participation virtual spaces, or in which events the users have gotten involved and which events the users experienced. Thus, the participation record management section 204 functions as an involvement history management section 206.

The system login management section 210 performs various controls related to the system login.

The system login management section 210 includes an event execution status grasping section 212, a restriction management section 214, a second virtual space selection section 216, and a restriction target presentation control section 218.

The event execution status grasping section 212 controls acquisition of information regarding the latest execution status of occurrence incidents (events) that have occurred in the virtual spaces 3 managed by the respective game server systems 1100G.

The restriction management section 214 manages restrictions on target user's participation in the virtual spaces other than the first virtual space, based on: (a) the difference between a first occurrence incident, which is an occurrence incident in the first virtual space, and an occurrence incident in each of the virtual spaces other than the first virtual space 3, and (b) target user's participation record for the first virtual space. Specifically, the restriction management section 214 determines whether each of the virtual spaces 3 other than the first virtual space is a restricted virtual space, which is a target of a restriction on target user's participation, and then manages the restriction on this restricted virtual space by prohibiting target user's participation. This process corresponds to a process related to the restriction on determining participation virtual space that the user terminal 1500 of the user who requests the system login participates first after the system login.

It should be noted that the restriction management section 214 excludes, from the participation restriction targets, the virtual space 3 in which the user was playing when he/she last performed the system logout (the virtual space 3 in which the user was last played).

The second virtual space selection section 216 selects the second virtual space in which the target user will participate, from among the virtual spaces 3 other than the first virtual space, based on whether each of the virtual spaces 3 is the restricted virtual space. Specifically, the second virtual space selection section 216 accepts, based on the selection operation by the target user, a participation virtual space in which the target user makes a request to participate as the second virtual space, from among the virtual spaces other than the first virtual space which are not the restricted virtual space and then selects a participation request virtual space as the second virtual space. This process corresponds to a process of selectively operating an option from among options of the virtual spaces to which the participation restriction notification display 37 is not attached through the display control of the system login screen W2 (see FIG. 7) and the participation request option display 33 and then setting the virtual space of the operated selection, as the participation virtual space (second virtual space) in which the user will participate first after the system login.

The restriction target presentation control section 218 controls presentation to the target user of whether each of the virtual spaces 3 other than the first virtual space is the restricted virtual space. This process corresponds to a process of controlling the display of the restriction notification display 34 for each option through the participation request option display 33 on the system login screen W2 (see FIG. 7).

The timer section 280p utilizes a system clock to perform various types of time measurements, such as a current date and time or a limited time period.

The sound generation section 290p is implemented by executing an IC or software that generates sound data or performs decoding. The sound generation section 290p outputs a generated sound signal to the sound output section 390p. The sound output section 390p is implemented by a speaker, for example, and emits sound based on the sound signal.

The image generation section 292p generates images of various types of management screens for system management of the portal server system 1100P and outputs the image data to the image display section 392p. The image display section 392p is implemented by a device that displays an image, such as a flat panel display, a head-mounted display, or a projector.

The communication control section 294p executes a data process related to data communication and realizes data exchange with an external device via the communication section 394p. The communication section 394p is connected to the networks 9 to realize communication. For example, the communication section is implemented by a wireless communication device, a modem, a terminal adaptor (TA), a jack for wired communication cable, or a control circuit, for example. The communication section 394s corresponds to each communication device 1153 in the example in FIG. 1.

The storage section 500p stores, for example, programs and various types of data for use in implementing various types of functions of causing the processing section 200p to comprehensively control the portal server system 1100P. In addition, the storage section 500p is used as a work area for the processing section 200p and temporarily stores results of calculations, for example, executed by the processing section 200p in accordance with the various types of programs. This function is implemented by an IC memory such as a RAM or a ROM, a magnetic disk such as a hard disk, an optical disk such as a CD-ROM or a DVD, or an online storage, for example. The storage section 500p corresponds to each IC memory 1152 mounted on the main body device or a storage medium such as a hard disk in the example illustrated in FIG. 1. The storage section 500p may further include an online storage.

FIG. 10 illustrates examples of programs and data stored in the storage section 500p of the portal server system 1100P.

The storage section 500p stores a portal server program 501, a distribution client program 502, game server registration data 510, application restriction specified data 512, user management data 520, participation restriction management data 550, and a current date and time 900. It should be noted that the storage section 500p stores other programs and data (e.g., a timer, a counter, or various types of flags) as appropriate.

The portal server program 501 is a program to be read and executed by the processing section 200p to cause the portal server system 1100P to function as the user management section 202 or the system login management section 210, for example.

The distribution client program 502 is an original of a client program to be provided to and executed by each user terminal 1500.

The game server registration data 510 is prepared for each game server system 1100G and contains unique server IDs, virtual spaces ID managed by the game server systems 1100G, and server access information required to connect to the game server systems 1100G so as to make data communication possible. Obviously, the game server registration data 510 may contain any other type of data as appropriate.

The application restriction specified data 512 is data that is prepared for each special event 12 (repetitive involvement prohibition event) and that specifies restrictions on participation in the virtual spaces 3 and actions within the virtual spaces 3 which are applied to the user in relation to each special event. A single piece of application restriction specified data 512 contains, for example, an event ID 514, participation restriction application requirement 516, and an action restriction class specified flag 518.

The participation restriction application requirement 516 describes conditions to be satisfied in order to prohibit the user who has already gotten involved in an event within any of the virtual spaces 3, from participating in the virtual spaces 3 managed by the game server systems 1100G.

For example, the participation restriction application requirement 516 indicates a condition about an event execution state. For example, "occurrence of no event", "execution of event", or "no setting" may be set. Both "occurrence of no event" and "execution of event" may be set simultaneously.

When the participation restriction application requirement 516 is set to "occurrence of no event", the user who has already participated in a certain event in the past is prohibited from participating in a virtual space 3 in which this event has not occurred.

When the participation restriction application requirement 516 is set to "execution of event", the user who has already gotten involved in a certain event in the past is prohibited from participating in a virtual space 3 in which this event has already occurred but is still in progress.

If the participation restriction application requirement 516 is set to "no setting", even if the user has already gotten involved in a certain event in the past, the prohibition of participation in a virtual space 3 is not applied based on the event. Instead, the action restriction specified by the action restriction class specified flag 518 is applied, thereby suppressing "event trolling", "spoiling" and other nuisances.

It is preferable to set "occurrence of no event" and "execution of event" for a special event 12 that is a kind of a private event to be executed for a single user character 4. It is preferable to set "no setting" for an event in which a plurality of user characters 4 can get involved in a single event at the same time, such as a world class event that covers all the virtual spaces 3.

The action restriction class specified flag 518 stores a flag for each type of action restriction and indicates that the flagged action restriction is applied to the user in relation to a certain event. The type of action restriction can be set as appropriate. For example, an approach prohibition, an event participation registration prohibition, chat prohibition, and a bulletin board writing prohibition may be set.

The approach prohibition flag is set to "1" when an action restriction that prohibits an approach to an area that is a predetermined distance apart from an event area is applied. The event participation registration prohibition flag is set to "1" when an action restriction that prohibits registration procedures for the event is applied. When these flags are set to "1" (flagged), an approach to the event and an involved action such as participation registration are prohibited. If there is a mechanism for an event occurrence requirement, a mechanism operation prohibition flag may be set as a prohibition flag for the same intention. If the event occurrence requirement includes the use of a specific item, a specific item use prohibition flag may be set.

The chat prohibition and bulletin board writing prohibition flags are set to "1" if the user wishes to prevent spoiling by prohibiting chatting or writing on the bulletin board, respectively.

The user management data 520 is prepared for each user who has completed the registration procedure. In addition, the user management data 520 stores various types of data related to the user and is managed by the user management section 202.

A single piece of user management data 520 contains a unique user account 521, game save data 530, and participation record data 540, for example, as illustrated in FIG. 11. Obviously, a single piece of user management data 520 may contain any other types of data as appropriate.

The game save data 530 contains user character setting data 531, owned item management data 533, play performance data 537, and a last participation virtual space ID 539. The user character setting data 531 contains data describing the various settings and states of the user characters 4 at the time of saving. The owned item management data 533 contains data describing the latest states of items owned by the users. The last participation virtual space ID 539 indicates the virtual space 3 in which each user was participating when the last gameplay was completed. Obviously, The game save data 530 may contain any other type of data as appropriate.

The participation record data 540 contains participation history data 541 in which participation virtual spaces ID are related to participation periods and event involvement history data 545. Obviously, other types of data can be contained as appropriate.

The event involvement history data 545 is created every time the user gets involved in an event. The event involvement history data 545 contains an involvement event ID that indicates events in which the user has gotten involved, a participation virtual space ID, a date and time of the involvement, and an event result that indicates a result acquired by the user in the event. The event involvement history data 545 may be created only for each special event 12.

Returning to FIG. 10, the participation restriction management data 550 stores various types of data for use in managing restrictions on participation in the virtual spaces 3. The portal server system 1100P is created every time the system login procedure is performed and stores various types of data regarding restrictions on participation in the virtual spaces 3 after the system login.

A single piece of participation restriction management data 550 contains a target user account 551, event execution status data 552, and application restriction determination results 557.

The event execution status data 552 stores information received in response to a predetermined event execution status report request that has been transmitted to each game server system 1100G (servers, each of which is considered to be an option in the participation request option display 33; see FIG. 7), which manages virtual spaces 3 that are candidates for the participation virtual space. Specifically, the event execution status data 552 contains a game server ID 553, a virtual space ID 554, and event management data (copy) 555.

The event execution status data 552 is created for each of the events that have occurred in the virtual spaces 3 of the game server systems 1100G. The event execution status data 552 contains an event ID, an execution period, an end flag, and event result data. The execution period contains a date and time when an event occurred and a date and time when the event has been terminated and thus the user can no longer get involved in this event.

The information to be returned to the portal server system 1100P in response to an event execution status report request may be limited to the special events 12 (repetitive involvement prohibition events).

Each application restriction determination result 557 is prepared for each candidate for the participation virtual space (for each virtual space ID 554 or each option of the participation request option display 33; see FIG. 7) and stores information about the types of restriction that will be attached and applied when the user participates in a certain virtual space.

A single application restriction determination result 557 contains a virtual space ID related to each option in the participation request option display 33, a participation restriction flag, and an action restriction class specified flag. The application restriction determination result 557 is a source of which restriction notification display 34 is attached to and displayed in the participation request option display 33. An initial value of each of the participation restriction flag and the action restriction class specified flag is set to "0".

When event management data (copy) 555 of the same event as the special event 12 in the virtual space 3 indicated by the virtual space ID in the application restriction determination result 557 in which the target user is already involved is referenced, and if the execution status of this event satisfies the condition (participation restriction application requirement) for the participation restriction to be applied to the event, the participation restriction flag is set to "1".

The action restriction class specified flag for the application restriction determination result 557 is provided for each type of action restriction, similar to the action restriction class specified flag 518. The action restriction class specified flag in the application restriction determination result 557 is set with reference to the action restriction class specified flag 518 for an event that is the same as the special event 12 in which the target user has already been involved. If the flag is set to "1" in any of action restriction class specified flags 518, a flag of a certain action restriction type is also set to "1".

FIG. 12 is a block diagram illustrating a functional configuration example of a game server system 1100G (1100Ga, 1100Gb, . . . ). Each game server system 1100G includes an operation input section 100g, a processing section 200g, a sound output section 390g, an image display section 392g, a communication section 394g, and a storage section 500g.

The operation input section 100g is a means for inputting various types of operations by which the game server system 1100G is to be managed. For example, the operation input section 100g corresponds to a keyboard, a touch panel, or a mouse.

The processing section 200g is implemented, for example, by a processor serving as an arithmetic circuit such as a CPU, a GPU, an ASIC, or an FPGA and an electronic component such as an IC memory, and performs input-and-output control of data among functional sections including the operation input section 100g and the storage section 500g. In addition, the processing section 200g performs various types of calculation processes, based on a predetermined program and data, an operation input signal from the operation input section 100g, or data received from the user terminals 1500 and the portal server system 1100P, for example, to comprehensively control operation of the game server system 1100G.

The processing section 200g includes a game server control section 230, a timer section 280g, a sound generation section 290g, an image generation section 292g, and a communication control section 294g. Obviously, the processing section 200g may include any other functional section as appropriate.

The game server control section 230 implements various types of functions as a game server. For example, the game server control section 230 performs various types of control related to participation registration control for the users (play login), control of the user characters 4, game progress control, control of an NPC, or management of a background object.

The game server control section 230 includes an occurrence incident management section 232, a second virtual space selection section 234, a restriction management section 236, a special treatment control section 242, and an action restriction notification control section 244.

The occurrence incident management section 232 manages an occurrence incident, which is an incident that occurs or probably occurs in any of the managed virtual spaces 3. Specifically, the occurrence incident management section 232 controls and monitors occurrences of the regular events 10 and the special events 12 (see FIGS. 3A and 3B) and execution statuses of the events that have occurred, and records and manages information about the execution statuses.

The occurrence incident management section 232 performs an independent process in accordance with a time and state of the virtual space 3 in each game server system 1100G. Thus, the occurrence incident management section 232 can be responsible for asynchronous execution control of the same event in the plurality of virtual spaces 3 that exist in parallel in the entire virtual space control system 1000.

The second virtual space selection section 234 is involved in movements of the user characters 4 in the virtual spaces 3 using the warp gates 6 (see FIGS. 4 and 5) and performs various controls in order to select, from among the virtual spaces other than the first virtual space, a second virtual space in which the target user will newly participate. The first virtual space is a virtual space 3 in which the target user managed by a game server system 1100G is participating. The next participation virtual space corresponds to the second virtual space.

Specifically, the second virtual space selection section 234 performs: (a) the presentation, to the target user, of whether each of the virtual spaces other than the first virtual space is the restricted virtual space (e.g., the displaying of the participation restriction notification display 37; see FIG. 8), and (b) the selection of the second virtual space, based on the selection operation by the target user.

However, when a predetermined condition is satisfied (e.g., when the selection operation on the destination option display 40 is not completed within a time limit), the second virtual space selection section 234 automatically selects the second virtual space in which the target user will next participate, from among the virtual spaces other than the first virtual space and preferentially selects the virtual space 3 that is not the restricted virtual space.

The restriction management section 236 manages a restriction on target user's participation in a virtual space other than the first virtual space, based on (a) the difference between the first occurrence incident, which is an occurrence incident in the first virtual space, and an occurrence incident in the virtual space other than the first virtual space, and (b) target user's participation record for the first virtual space.

Specifically, the restriction management section 236 determines whether each of the virtual spaces other than the first virtual space is the restricted virtual space, which is a target for which target user's participation is to be restricted, and manages a restriction on the target user in the restricted virtual space. More specifically the restriction management section 236 determines that a virtual space in which an occurrence incident equivalent to the first occurrence incident has not occurred and in which an occurrence incident is determined to have been involved (experienced) by the target user in the first virtual space, based on the participation record, is the restricted virtual space. Then, the restriction management section 236 manages the restriction on the restricted virtual space by prohibiting target user's participation. This process concerns the movement to a virtual space 3 via the warp gates 6 and corresponds to a process of restricting participation in the virtual space 3 that has been determined to be the restricted virtual space (see FIG. 4).

The restriction management section 236 includes an action restriction management section 238 and an information restriction management section 240.

The action restriction management section 238 manages a restriction on an action of the target user who has participated in the second virtual space when the second virtual space is the restricted virtual space (see FIG. 5).

Specifically, the action restriction management section 238 manages a restriction on the target user's involved action for incidents that have already occurred in the first virtual space but have not yet occurred in the second virtual space, based on the first occurrence incident and the second occurrence incident, which is an occurrence incident in the second virtual space.

The information restriction management section 240 restricts, of actions of the target user who participated in the second virtual space, one related to the transmission of information between users. This process corresponds to a process of concealing information (confidential target keyword 579) to be concealed in chats (see FIG. 6).

The special treatment control section 242 performs a predetermined special treatment control so that the target user or a character operated by the target user is treated specially in the second virtual space, based on the restrictions managed by the action restriction management section 238. This process corresponds to a process of performing control so as to attach and display the identification marker 20 to and on a user character 4 that has moved from another virtual space 3 via the warp gates 6 (see FIG. 6).

The action restriction notification control section 244 performs control so as to notify the target user that his/her action is to be restricted in the second virtual space before he/she participates in the second virtual space. This process corresponds to a process of controlling the display of the restriction notification display 34 (see FIG. 8).

The notification control may include the control by which a pop-up display that the action restriction is to be applied is displayed because the same event has been involved in the past, every time the restriction management section 236 restricts the action.

The timer section 280g utilizes a system clock to perform various types of time measurements such as a current date and time or a limited time period.

The sound generation section 290g is implemented by executing an IC or software that generates sound data or performs decoding, and generates or decodes sound data of operational sounds, sound effects, background music (BGM), or voice speech, for example, related to system management of each game server system 1100G or provision of the online game. In addition, the sound generation section 290g outputs a sound signal related to the system management to the sound output section 390g. The sound output section 390g is implemented by a speaker, for example, and emits sound based on the sound signal.

The image generation section 292g generates images of various types of management screens for the system management of each game server system 1100G, and outputs display control signals for use in displaying the generated images to the image display section 392g. The image display section 392g is implemented by a device that displays an image, such as a flat panel display, a head-mounted display, or a projector.

Furthermore, the image generation section 292g generates images related to gameplay. For example, the image generation section 292g renders an image of the virtual space 3 to be displayed on each user terminal 1500.

The communication control section 294g realizes data exchange with an external device via the communication section 394g. The communication section 394g is connected to the networks 9 to realize communication. For example, the communication section 394g is implemented by a wireless communication device, a modem, a terminal adaptor (TA), a jack for wired communication cable, or a control circuit. The communication section 394g corresponds to each communication device 1153 in the example in FIG. 1.

The storage section 500g stores, for example, programs and various types of data for use in implementing various types of functions that cause the processing section 200g to comprehensively control the game server systems 1100G. Furthermore, the storage section 500g is used as a work area for the processing section 200g and temporarily stores, for example, results of calculations executed by the processing section 200g in accordance with various types of programs. This function is implemented by an IC memory such as a RAM or a ROM, a magnetic disk such as a hard disk, an optical disk such as a CD-ROM or a DVD, an online storage, or the like. The storage section 500g corresponds to an IC memory 1152 mounted on the main body device or a storage medium such as a hard disk, in the example illustrated in FIG. 1. The storage section 500g may further include an online storage.

FIG. 13 is a diagram illustrating an example of programs and data stored in the storage section 500g of each game server system 1100G. The storage section 500G stores, for example, a game server program 503, the game server registration data 510, game initial setting data 560, virtual space control data 600, the participation restriction management data 550g, and a standard date and time 901 that indicates a current date and time in the real world at a site where the game server system 1100G is installed. Obviously, the storage section 500G may store any other type of data.

The game server program 503 is a program to be read and executed by the processing section 200g to cause the processing section 200g to function as the game server control section 230.

The game initial setting data 560 stores various types of initial setting data for the online game. For example, the game initial setting data 560 includes the event definition data 570.

The event definition data 570 is prepared for each of all events that may occur in the virtual space 3 (incidents that probably occur; including the regular events 10 and the special events 12) and stores various definition data related to those events.

Figure 14:
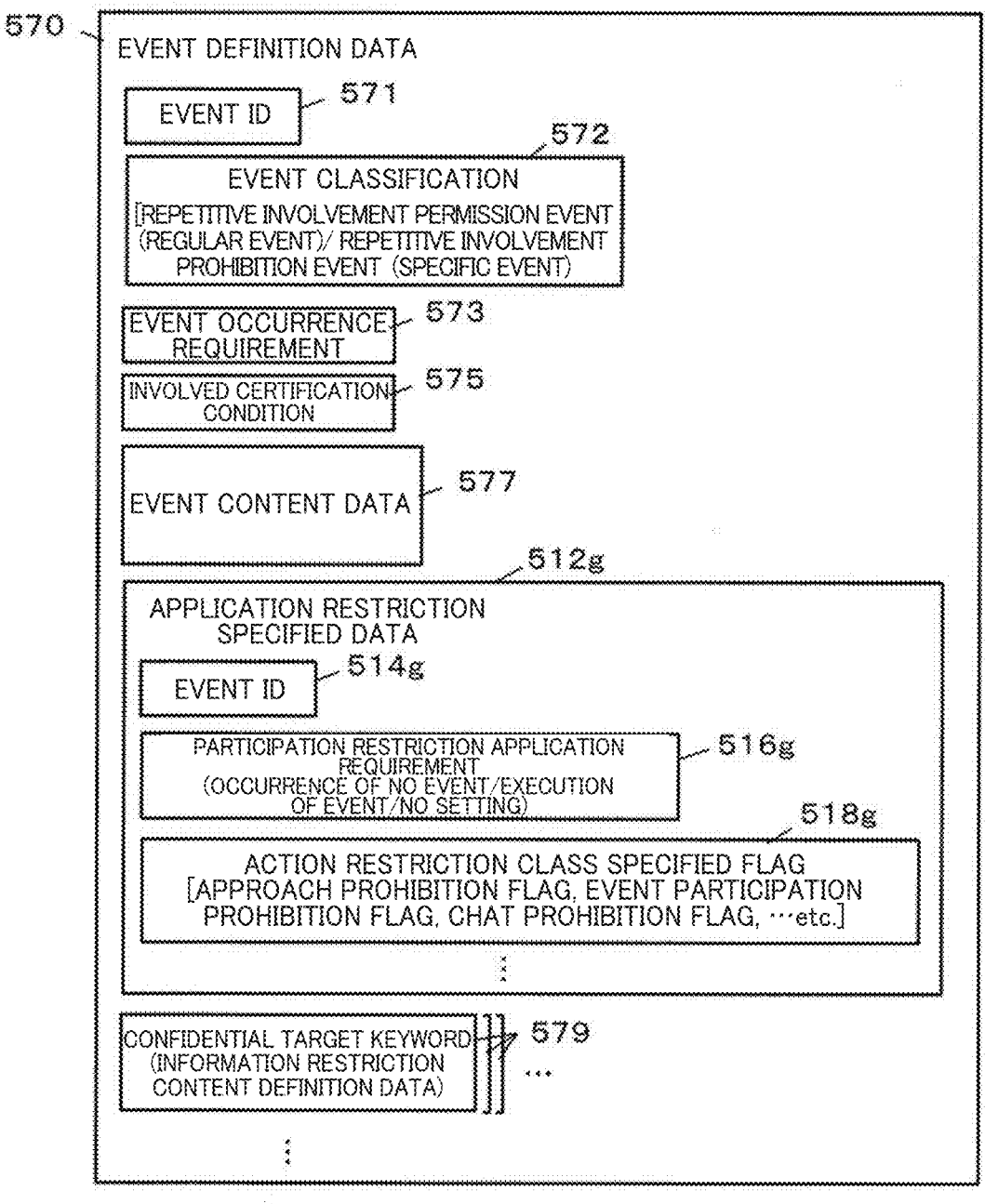
FIG. 14 illustrates a data configuration example of event definition data.

As illustrated in FIG. 14, a single piece of event definition data 570 contains, for example, a unique event ID 571, event classification 572, an event occurrence requirement 573, an involved certification condition 575, event content data 577, application restriction specified data 512g, and a confidential target keyword 579.

The event classification 572 indicates whether a certain event is a regular event 10, that is, a repetitive involvement permission event or a special event 12, that is, a repetitive involvement prohibition event.

The involved certification condition 575 describes a condition for regarding involvement of a user character 4 in the event as having been completed.

The content of the involved certification conditions 575 is set as appropriate in accordance with the content of the event. For example, if the event is a kind of event that a user can challenge multiple times until it is cleared, the involved certification condition 575 is described as an event clear condition. If there is a limitation on the number of times or duration of play, the involved certification condition 575 is described as the maximum number of times or duration.

The event content data 577 contains various types of setting data for use in executing an event (e.g., data specifying the type and number of rare items to be given as clear prizes).

The application restriction specified data 512g contains the same content as in the application restriction specified data 512 (see FIG. 10) stored in the portal server system 1100P. A single piece of application restriction specified data 512g contains an event ID 514g, a participation restriction application requirement 516g, and an action restriction class specified flag 518g.

Returning to FIG. 13, the virtual space control data 600 is created for each of the virtual spaces 3 managed by the game server systems 1100G and stores various types of data related to each virtual space 3. In the present embodiment, a single game server system 1100G controls and manages a single virtual space 3, so that the number of pieces of virtual space control data 600 is only one.

The virtual space control data 600 contains a management server ID 601, a virtual space ID 602, a virtual space date and time 603, the event management data 605 for each event that has occurred, user character management data 607 for each user character 4 participating in the virtual space, and event involvement history data (copy) 609 for each user participating in the relevant virtual space. Obviously, the virtual space control data 600 may contain any other type of data as appropriate.

A single piece of event management data 605 contains an event ID, a date and time of the occurrence, event control data, a participating user account, an event result, and an end flag. Obviously, a single piece of event management data 605 contains any other type of data as appropriate. Some pieces of data contained may be omitted as appropriate. This means that the created event management data 605 indicates the execution status of each event in the virtual space 3.

A single piece of user character management data 607 is created for each user participating in the virtual space 3 and stores a user account, a character control parameter value indicating the latest state of the character, position coordinates, motion control data, and a play performance, for example.

A single piece of event involvement history data (copy) 609 is a copy of the event involvement history data 545 (see FIG. 11) of the user participating in the virtual space 3. The event involvement history data (copy) 609 stores a user account, an involvement event ID list indicating an event in which the user has gotten involved when he/she is participating in the virtual space 3, and an event result. Obviously, the event involvement history data (copy) 609 may contain any other type of data.

FIG. 15 illustrates a data configuration example of the participation restriction management data 550g.

The participation restriction management data 550g has the same data structure as the participation restriction management data 550 (see FIG. 10) and stores various types of data for use in managing a restriction on participation in the virtual space 3. Each game server system 1100G creates the participation restriction management data 550g for each warp movement control and stores various types of data regarding a restriction on participation in a virtual space 3 (next participation virtual space) to which a user character 4 moves via the warp gates 6.

Figure 16:
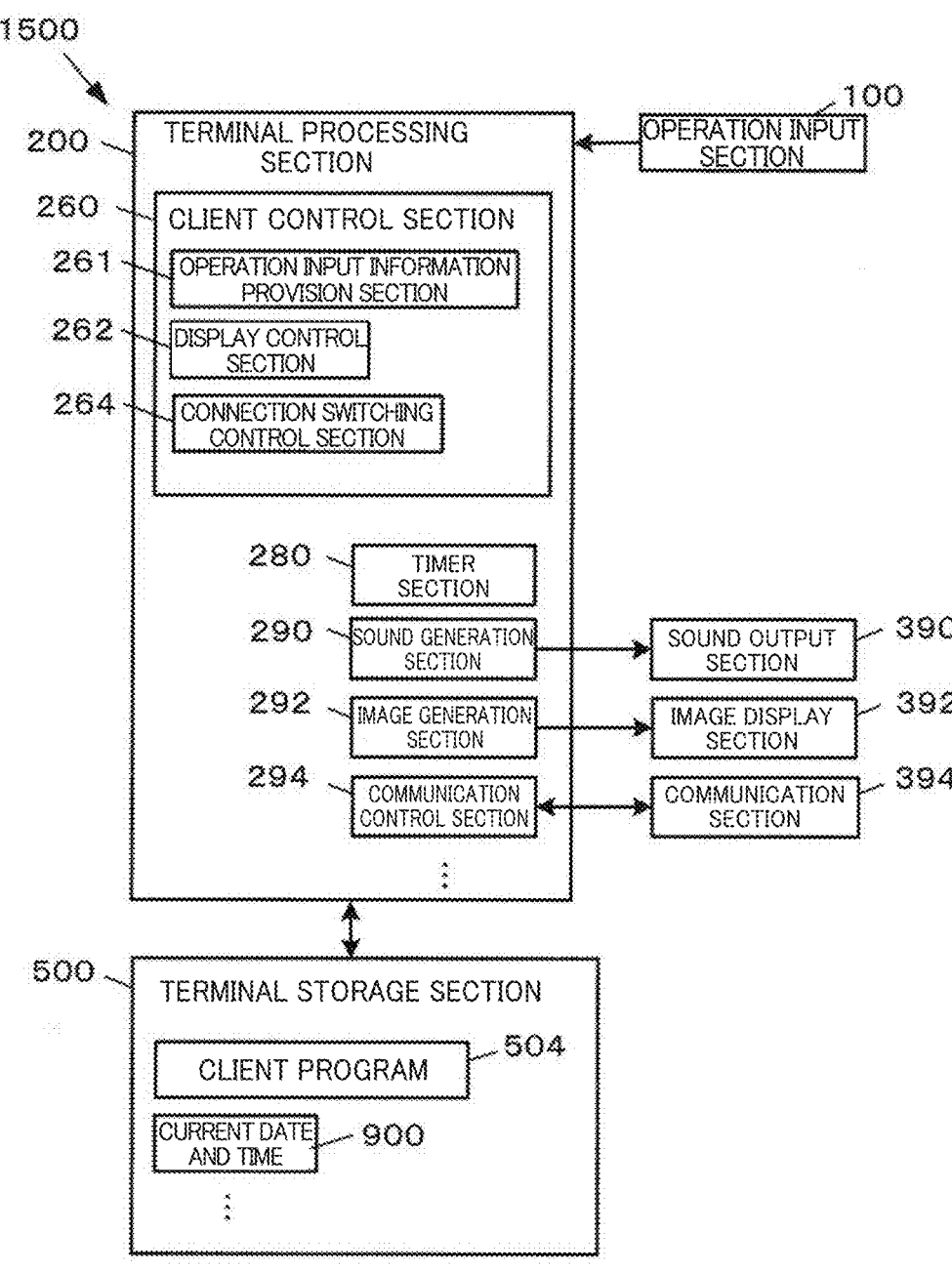
FIG. 16 is a functional block diagram illustrating a functional configuration example of a user terminal.

FIG. 16 is a functional block diagram illustrating a functional configuration example of a user terminal 1500. Each user terminal 1500 includes an operation input section 100, a terminal processing section 200, a sound output section 390, an image display section 392, a communication section 394, and a terminal storage section 500.

The operation input section 100 outputs operation input signals to the terminal processing section 200 in accordance with various types of operation inputs performed by the user.

The operation input section 100 can be implemented, for example, by a push switch, a joystick, a touch pad, a track ball, an accelerometer, or a gyro.

The terminal processing section 200 is implemented, for example, by a microprocessor such as a CPU or a GPU and an electronic component such as an IC memory, and performs input-and-output control for data among functional sections including the operation input section 100 and the terminal storage section 500. In addition, the terminal processing section 200 performs various types of calculation processes, based on a predetermined program and data, an operation input signal from the operation input section 100, or various types of data received from the portal server system 1100P and the game server systems 1100G, thereby controlling operation of the user terminal 1500.

The terminal processing section 200 includes a client control section 260, a timer section 280, a sound generation section 290, an image generation section 292, and a communication control section 294.

The client control section 260 performs various types of control by which the user terminal 1500 functions as a man-machine interface (MMIF), as control of a game client in the virtual space control system 1000. Specifically, the client control section 260 includes an operation input information provision section 261, a display control section 262, and a connection switching control section 264.

The operation input information provision section 261 performs control so as to transmit operation input information to the game server systems 1100G in accordance with input from the operation input section 100.

The display control section 262 performs control so as to display various types of images, based on data received from the game server systems 1100G.

The connection switching control section 264 performs control so as to select participation virtual space 3, that is, a game server system 1100G to which the user terminal 1500 is to be connected in relation to gameplay.

Specifically, the connection switching control section 264 receives a given participation token from the portal server system 1100P after the system login. In response, the connection switching control section 264 automatically performs control so as to disconnect from the portal server system 1100P and to connect to the game server system 1100G designated by the participation token.

The connection switching control section 264 also pertains to the movement of a user character 4 to a virtual space 3 through the warp gate 6 and receives a given participation token from the game server system 1100G for the virtual space 3 in which the user character 4 is participating. In response, the connection switching control section 264 performs control so as to automatically switch the connection to another game server system 1100G (the game server system 1100G that manages the virtual space 3 at the destination) indicated by the participation token and to play login to the game server system 1100G.

The timer section 280 utilizes a system clock to perform time measurements such as a current date and time or a limited time period.

The sound generation section 290 is implemented, for example, by a digital signal processor (DSP) or a processor such as a sound synthesizing IC and an audio codec that makes it possible to play a sound file, generates sound signals of music, sound effects, or various types of operational sounds, and outputs the generated sound signals to the sound output section 390. The sound output section 390 is implemented by a device that outputs sound (emits sound)

based on the sound signals inputted from the sound generation section 290, such as a speaker.

The image generation section 292 outputs a display control signal for use in causing the image display section 392 to display an image based on control of the client control section 260. The image generation section 292 corresponds to a graphics processing unit (GPU), a graphic controller, or a graphic board mounted on the control board 1550 in the example illustrated in FIG. 1. The image display section 392 is implemented by a device that displays an image, such as a flat panel display, a head-mounted display, or a projector.

The communication control section 294 performs a data process related to data communication and realizes data exchange with an external device via the communication section 394.

The communication section 394 is connected to the networks 9 to realize communication. For example, the communication section 394 is implemented by a wireless communication device, a modem, a terminal adaptor (TA), a jack for wired communication cable, or a control circuit. The communication section 394 corresponds to the communication module 1553 in the example in FIG. 1.

The terminal storage section 500 stores programs and various types of data for causing the terminal processing section 200 to implement given functions. Furthermore, the terminal storage section 500 is used as a work area for the terminal processing section 200 and temporarily stores, for example, results of calculations executed by the terminal processing section 200 in accordance with various types of programs or input data inputted from the operation input section 100. These functions are implemented, for example, by an IC memory such as a RAM or a ROM, a magnetic disk such as a hard disk, or an optical disk such as a CD-ROM or a DVD. The terminal storage section 500 corresponds to the IC memory 1552 mounted on the control board 1550 in the example in FIG. 1.

Specifically, the terminal storage section 500 stores a client program 504 (an application program) for use in causing the user terminal 1500 to function as the client control section 260 and a current date and time 900. Obviously, the terminal storage section 500 may store any other type of data as appropriate. For example, the terminal storage section 500 stores a participation token and a participation token, for example.

FIG. 17 is a flowchart illustrating a flow of a system login process to be performed by the portal server system 1100P. The system login process is a process of setting up a virtual space 3 to be participated by a single user after his/her system login.

In this process, the portal server system 1100P checks event execution statuses in the virtual spaces 3 managed by the respective game server systems 1100G (Step S10). Specifically, the portal server system 1100P transmits a predetermined event execution status report request to each game server system 1100G. When receiving this request, each game server system 1100G transmits back the event management data 605 for the virtual space managed thereby to the portal server system 1100P, together with the management server ID 601 and the virtual space ID 602. The portal server system 1100P creates the event execution status data 552 for each game server system 1100G, based on the received data.

Then, the portal server system 1100P determines the restricted virtual spaces from among the virtual spaces 3 and then determines which restriction type (which of participation restriction, action restriction, and information restriction) is to be applied to each restricted virtual space (Step S12). Specifically, the portal server system 1100P creates the application restriction determination result 557 for each virtual space 3.

The portal server system 1100P then displays the system login screen W2 (see FIG. 7) at the user terminal 1500 of the user who requests the system login (Step S14). In the participation request option display 33, the restriction notification display 34 is displayed for each of the options of the virtual spaces 3, based on the application restriction determination result 557 for each virtual space 3. A virtual space for which the participation prohibition flag is set to "1" is presented as an option in the participation request option display 33 but no selection operation thereon is accepted.

The portal server system 1100P then starts accepting the user's selection operation on a participation request option in the participation request option display 33 (Step S16).

When there is selection operation within a predetermined time limit from the acceptance start (YES in Step S18), the portal server system 1100P sets the virtual space of the option made by the selection operation, as the participation virtual space (Step S20).

When there is no selection operation within the time limit (NO in Step S18), the portal server system 1100P automatically sets the participation virtual space (Step S22). Specifically, the portal server system 1100P may select and set the virtual space 3 with the lowest level of restriction of the application restriction determination results 557, as the participation virtual space. Alternatively, the portal server system 1100P may automatically select the virtual space 3 indicated by the last participating virtual space ID 539 of the user who requests the system login and may set the selected virtual space 3 as the participation virtual space.

The portal server system 1100P then creates a participation token and transmits it to the user terminal 1500 of the user who requests the system login (Step S26). Then, the portal server system 1100P creates authentication information for use in authenticating the participation token and transmits it to the game server system 1100G that manages the participation virtual space 3 (Step S28).

The content of the "participation token" can be set as appropriate. For example, the participation token may contain access information for use in accessing the game server system 1100G (e.g., URL, etc.), a one-time password, a user account, and a flag indicating that it is the system login. The "authentication information for use in authenticating the participating token" can also be set as appropriate. For example, the participation token may contain a one-time password, the individual identification information on the user terminal 1500 acquired through communication with the user terminal 1500, the user account, and a flag indicating that it is the system login.

When receiving the participation token, the user terminal 1500 automatically accesses the game server system 1100G indicated by the participation token and transmits a predetermined participation request.

Figure 18:
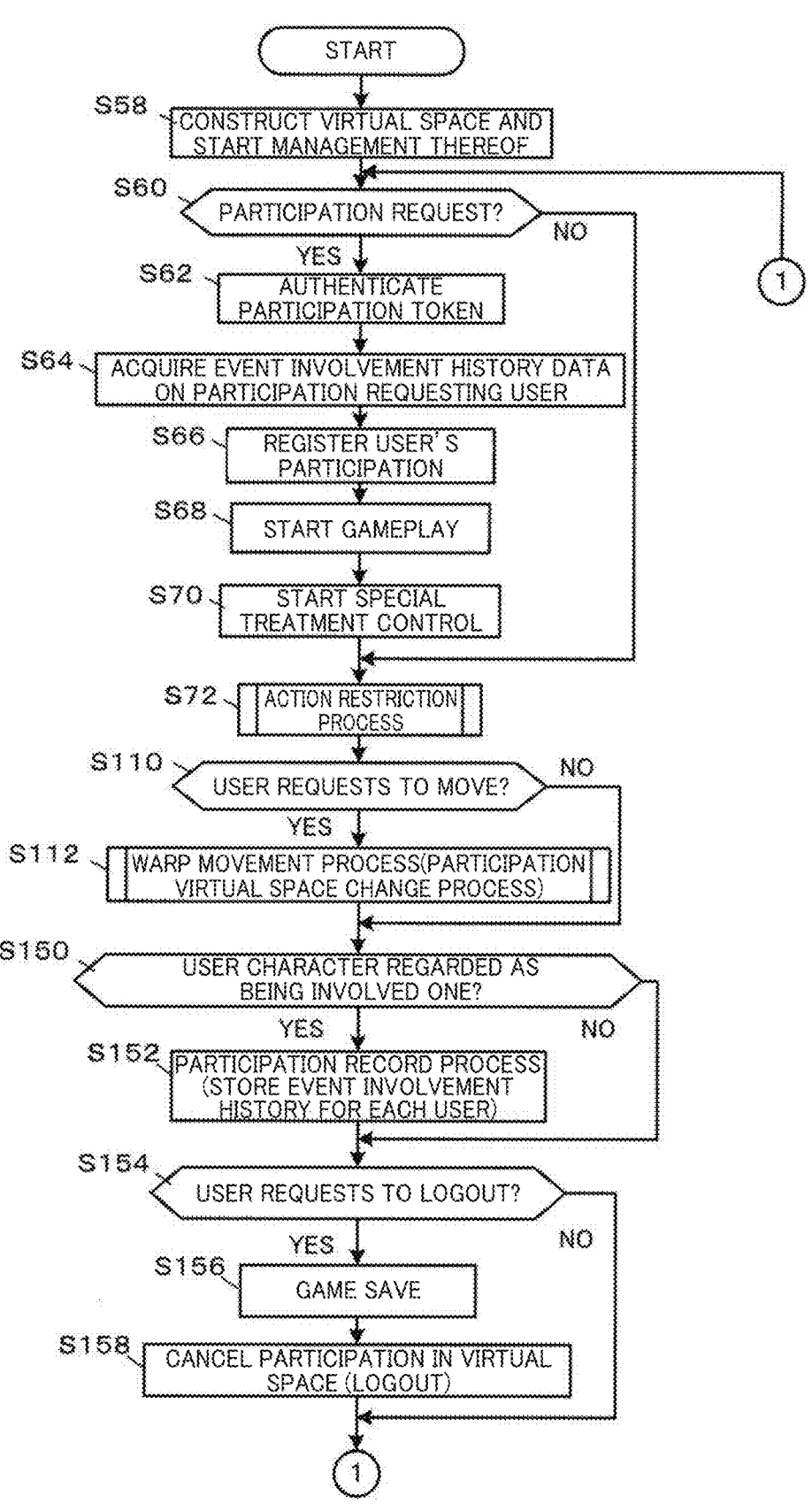
FIG. 18 is a flowchart of a flow of a process in a game server system.

FIG. 18 is a flowchart illustrating a process flow in a game server system 1100G. In this process, the game server system 1100G constructs the virtual space 3 and starts management control thereof (Step S58). The passage of time in the virtual world within the virtual space 3 and the occurrences of regular events 10 and special events 12 are thereby managed in accordance with an action of a user character 4 of the participating user in the virtual space 3.

When receiving a participation request from a user terminal 1500 (YES in Step S60), the game server system 1100G authenticates the participation token (Step S62). Then, the game server system 1100G acquires, from the portal server system 1100P, the event involvement history data 545 on the user of the user terminal 1500 that has requested the participation and stores the event involvement history data 545 as the event involvement history data (copy) 609 of the process target user (Step S64).

The event involvement history data (copy) 609 can be information about events in which the user of the user terminal 1500 who requested the participation (the participation requesting user) has been involved in the past in the virtual space 3 (first virtual space) that he/she played in. The acquisition of the event involvement history data 545 may be limited to the special events 12.

The game server system 1100G then registers, in the virtual space 3, the participation of the participation requesting user (Step S66). Specifically, the game server system 1100G acquires the game save data 530 of the participation requesting user from the portal server system 1100P and creates the user character management data 607 for the participation requesting user, in the virtual space control data 600.

The game server system 1100G then permits the participation requesting user to start to play a game (Step S68) and starts special treatment control (Step S70). In this case, the game server system 1100G places the user character 4 in the virtual space 3 and enables the user to play the game by starting motion control of the user character 4 in accordance with the operation input. In the special treatment control, the identification marker 20 is attached to the user character 4 of the user who has changed the participation virtual space and participated in it. When the user participates in a virtual space 3 first after the system login and starts to play the game, the identification marker 20 is not attached to the user character 4 in the virtual space 3.

The game server system 1100G performs an action restriction process (Step S72).

Figure 19:
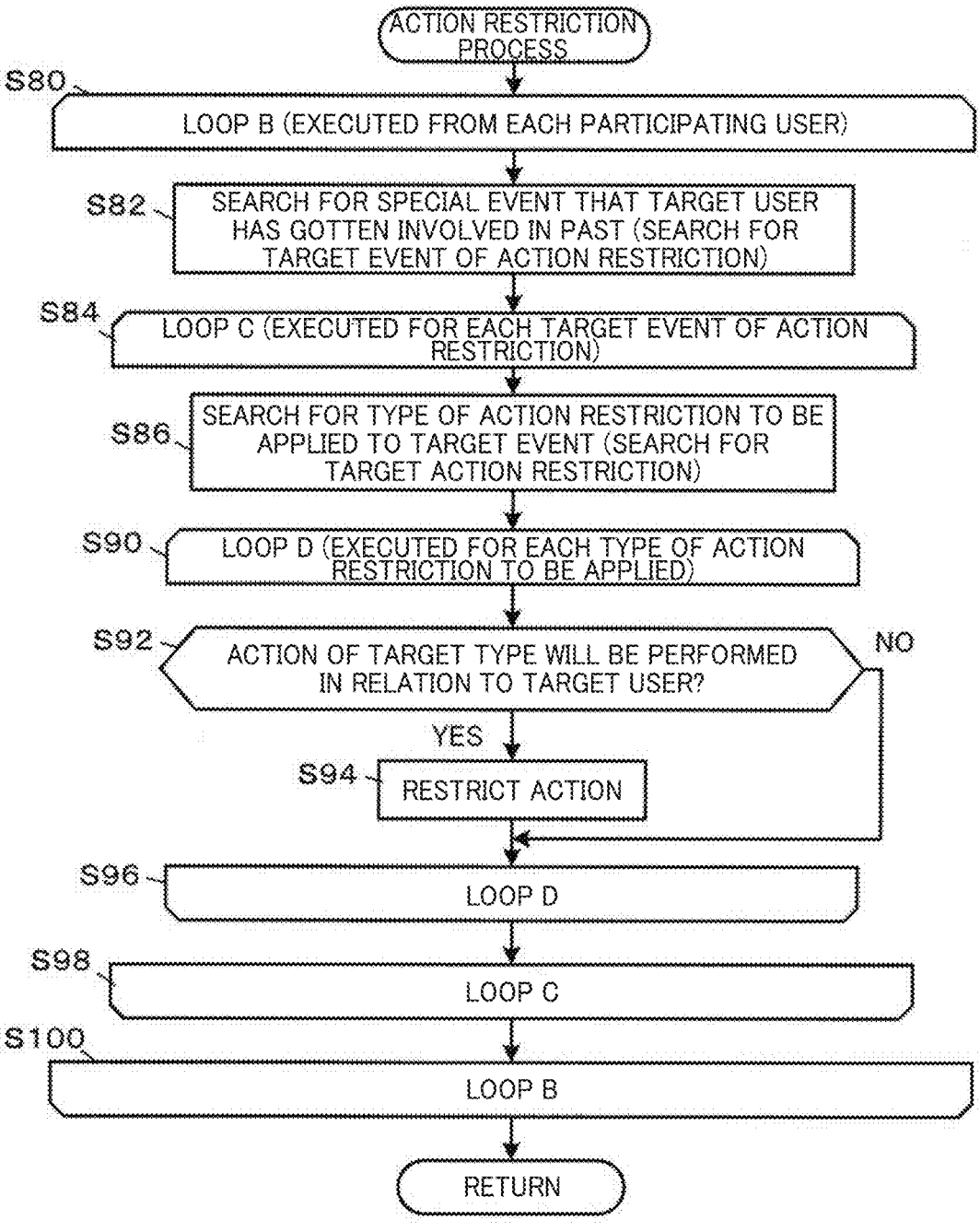
FIG. 19 is a flowchart of a flow of an action restriction process.

FIG. 19 is a flowchart of a flow of the action restriction process.

The game server system 1100G executes Loop B on each of the users who are participating in the virtual space 3 (Step S80 to Step S100).

In Loop B, the game server system 1100G refers to the event involvement history data (copy) 609 on the target user and searches for an event that is the same as the special event 12 that the target user has gotten involved in the past, as an event that is a target for an action restriction (Step S82). Then, the game server system 1100G executes Loop C for each of the target events for action targets (Step S84 to Step S98).

In Loop C, the game server system 1100G refers to the action restriction class specified flag 518g in the event definition data 570 on the target event and searches for the type of action restriction to be applied to the target event (Step S86). Then, the game server system 1100G executes Loop D for each of the types of action restrictions to be applied (Steps S90 to S96).

In Loop D, the game server system 1100G determines whether an action of the target type will be performed in relation to the target user and, when the determination result is positive (YES in Step S92), restricts this action (Step S94).

For example, when the target type of Loop D is "prohibition of approach", the game server system 1100G determines an event area of the target event. When the position coordinates of the user character 4 of the target user reach this event area, the game server system 1100G makes an affirmative determination. Then, the game server system 1100G prohibits the user character 4 from moving within the virtual space 3 so that the user character 4 cannot enter into the event area any further. The event area can be defined as appropriate. If the event is the raid event 7c, for example, the game server system 1100G may define a predetermined range around a location where a raid boss character will appear.

For example, if the target type of Loop D is "prohibition of event participation", the game server system 1100G makes an affirmative determination when detecting an event participation operation (e.g., operation of starting a registration procedure at the adventurers' guild, etc.) for the target event at the user terminal 1500. Then, the game server system 1100G disables the event participation operation so that the user cannot participate in the event. Specifically, the game server system 1100G removes this operation from the operation menu or rejects the operation input.

For example, when the target type of Loop D is "prohibition of attack action", the game server system 1100G makes an affirmative determination when detecting an attack operation on an NPC related to the target event at the user terminal 1500. Then, the game server system 1100G disables the attack operation so as not to perform the attack, so that the user character 4 cannot perform the attack action. The game server system 1100G performs a similar operation even if the target type of Loop D is a prohibition of a supportive action, such as the use of items or magic, on the user character 4 of another user who is participating in the target event.

For example, if the target type of Loop D is "prohibition of execution operation of a special event", the game server system 1100G makes an affirmative determination when detecting execution operation on the target event at the user terminal 1500. One example of the execution operation to be detected is, in a place where a special event is executed in response to the destruction of a predetermined ruin object, a destruction operation on this ruin object, for example. Then, the game server system 1100G disables the execution operation, prohibiting execution in response to the execution operation.

For example, if the target type of Loop D is "chat prohibition", when the input of chat text is detected at the user terminal 1500, the game server system 1100G divides the input text message into words and determines whether each of these words coincides with the confidential target keyword 579 (see FIG. 14) of the target event. If the game server system 1100G makes an affirmative determination in the coincidence case and, after performing the concealing process on the text specified by the confidential target keyword 579 of the target event (e.g., replacing the text with a predetermined foreshadowing character or image), sets chat text that has been subjected to the concealment process to a text message to be posted.

By executing Loops C and Loop D, the repetitive involvement in the same special event 12 is restricted based on whether an involved special event 12 (a first occurrence incident, which is an occurrence incident in the first virtual space in which the target user of Loop B has participated or been involved in the past) and an occurrence incident that has not yet been performed or are being performed in a currently involved virtual space 3 (an occurrence incident in a virtual space other than the first virtual space) coincide with or different from each other.

The above process prevents "event trolling", such as repetitively moving to other virtual spaces 3 to participate and get involved in the same special event 12 in order to obtain rare items because a user wants a rare item in addition to one acquired by clearing a certain special event 12. The process also prevents "spoiling" for a special event 12 in the virtual space 3 at the destination.

Moving to FIG. 18, when there is a user character 4 that has entered a warp gate 6 (YES in Step S110), the game server system 1100G regards the user of the user character 4 as a user who requests moving and then performs a warp movement process (Step S112).

FIG. 20 is a flowchart of a flow of the warp movement process.

The warp movement process is a process pertaining to a change of the participation virtual space for a user character 4 which has entered a warp gate 6 and is a process of setting a next participation virtual space.

In the warp movement process, the game server system 1100G checks the execution statuses of events in the virtual spaces 3 managed by the other game server systems 1100G (Step S120). Specifically, the game server system 1100G transmits predetermined event execution status report requests to the other game server systems 1100G. When receiving the request, each of the other game server systems 1100G transmits back, to the request transmission source, the event management data 605, the management server ID 601, and the virtual space ID 602 for the virtual spaces 3 managed thereby. The game server system 1100G creates the event execution status data 552g in the participation restriction management data 550g, based on the received data.

The game server system 1100G then determines restricted target virtual spaces from among the other virtual spaces 3 managed by the other game server system 1100G, and determines which restriction type (participation restriction, action restriction, or information restriction) is applied to each of the restricted target virtual spaces (Step S122). Specifically, the game server system 1100G creates the application restriction determination result 557g for each virtual space 3.

The game server system 1100G then displays the warp destination option screen W4 (see FIG. 8) at the user terminal 1500 of the user who requests moving (Step S124). In the destination option display 40 on the warp destination option screen W4, each of the other virtual spaces 3 is presented as a destination option, and the restriction notification display 34 is attached and displayed in accordance with the respective application restriction determination results 557g. Another virtual space 3 for which the participation prohibition flag is set to "1" is presented as an option in the destination option display 40 but no selection operation thereon is accepted. In short, the user character 4 is prohibited from using warp movement to participate in another virtual space 3 for which the participation prohibition flag is "1".

The game server system 1100G then starts accepting a user's selection operation on the destination options on the warp destination option screen W4 (step S126).

When there is a selection operation within a predetermined time limit from the acceptance start (YES in Step S128), the game server system 1100G sets the other virtual space 3 corresponding to the option made by the selection operation as the next participation virtual space (Step S130).

When there is no selection operation within the time limit (NO in Step S128), the game server system 1100G automatically sets the participation virtual space (Step S132). Specifically, the game server system 1100G may select and set the virtual space 3 to which the lowest level of or no restriction in the application restriction determination results 557g is applied, as the participation virtual space.

The game server system 1100G then generates a participation token and transmits it to the user terminal 1500 of the user who requests moving (Step S134). The game server system 1100G also generates authentication information to authenticate the participation token and transmits it to the game server system 1100G that manages the other virtual space 3 that has been set as the participation virtual space (Step S136).

When receiving the participation token, the user terminal 1500 automatically accesses the game server system 1100G indicated by the participation token and transmits a predetermined participation request.

Returning to FIG. 18, as described above, the game server system 1100G is performing control of the virtual space 3 by Step S58, thus causing the regular events 10 and the special events 12 to occur and controlling these events. In relation to this, the game server system 1100G creates and manages the event management data 605.

When detecting a user character 4 that is involved in an event that is in progress and that satisfies the involved certification condition 575 for this event (YES in Step S150), the game server system 1100G performs a participation record process on the detected user character 4 (Step S152).

Specifically, if the event in progress is the raid event 7c, for example, the game server system 1100G sets a clear condition (e.g., damage more than a predetermined value is given to a raid boss, etc.) as the involved certification condition 575. In this case, when the event is cleared, the game server system 1100G transmits a participation record request to the portal server system 1100P in relation to each user character 4 that has participated in the raid (in relation to each participating user account in the event management data 605).

This participation record request contains various types of data to be stored in the event involvement history data 545. When receiving the participation record request, the portal server system 1100P adds the event involvement history data 545 to the participation record data 540 in the user management data 520 of the requested user. In short, the user is recorded as that having already been involved in the event.

If a predetermined logout operation is entered the user terminal 1500, the game server system 1100G determines that there is a user who requests logout (YES in Step S154), performs a game save process on the user who requests the logout (Step S156), and cancels the participation of the user who requests logout (Step S158).

Specifically, the game server system 1100G transmits a game save request to the portal server system 1100P. This request contains the user account of the user who requests logout and data to be stored in the game save data 530. The portal server system 1100P updates the game save data 530 on the user who requests logout. Then, the game server system 1100G deletes the user character management data 607 on the user who requests logout from the virtual space control data 600 and erases the user character 4 from the virtual space 3.

As a result, in some embodiments, in a system that controls in parallel a plurality of virtual spaces which are set so as to have a common world view and that enables each user to change his/her participation virtual space, a technique that can reduce an action in which a user participates in different virtual spaces and disrupts another user's user experience is successfully provided.

In short, a virtual space control system 1000 manages an occurrence incident for each virtual space and manages a record of user's participation in each virtual space. The participation record also contains involvement records of the users in occurrence incidents in these virtual spaces. Then, the virtual space control system 1000 determines whether the same user will repetitively get involved in the same occurrence incident in a virtual space of his/her participation destination, based on the difference between an occurrence incident in a first virtual space and each of occurrence incidents in virtual spaces other than the first virtual space and a record of a user's participation in the first virtual space, and then restricts a change of the participation destination. As a result, in a system that controls in parallel a plurality of virtual spaces which are set so as to have a common world view and that enables each user to change his/her participation virtual space, it is possible to reduce an action in which a user participates in different virtual spaces and disrupts another user's user experience.

MODIFICATION EXAMPLES

An example of an embodiment to which the present disclosure is applied has been described so far. It should be noted that an embodiment to which the present disclosure is applicable is not limited to the foregoing embodiment. Various modifications may be made as appropriate, such as adding other elements, omitting some of the elements, or changing some of the elements.

Modification Example 1

In the above embodiment, for example, an operation system 1010 is configured with a portal server system 1100P and a plurality of game server systems 1100G; however, a configuration without the portal server system 1100P may be employed. In such cases, the system login may be performed on a game server system 1100G that clocks a current date and time closest to a current date and time clocked by a user terminal 1500, and a system login process (see FIG. 17) may be skipped. User management data 520 (see FIG. 10) that is to be stored in the portal server system 1100P in the above embodiment may be stored in and managed by the game server system 1100G that clocks the current date and time closest to the current date and time clocked by the user terminal 1500. In short, a user management section 202 (see FIG. 9) may be implemented in the game server systems 1100G.

Modification Example 2

In the foregoing embodiment, a portal server system 1100P is configured to store and manage user management data 520; however, a user terminal 1500 may be configured to store and manage a part or all of the user management data 520. In this case, when referring to data contained in the user management data 520, the game server system 1100G needs to make a request to the user terminal 1500, instead of making a request to the portal server system 1100P.

Modification Example 3

In the foregoing embodiments, an online game is illustrated as an example of virtual experiences; however, the game genre is not limited to massively multiplayer online role playing games (MMORPGs). In addition, a virtual experience is not limited to a gaming experience. Examples of such a virtual experience include: (a) an exposition experience of visiting various types of pavilions prepared in a virtual world; (b) an experience of a virtual amusement park, a virtual farm, and a virtual ranch that would not be realized in a real world; (c) a virtual experience of drifting in deep sea, air, and the universe; (d) an experience of assembling a virtual plastic model and a house; (e) a romantic experience in a virtual world; (f) an experience of fighting and competing in a virtual battlefield and a stadium. The contents of occurrence incidents, or events, may be set appropriately in accordance with the themes of those experiences.

Modification Example 4

In the foregoing embodiment, an example of a participation restriction is that, when a user character 4 attempts to participate in a virtual space 3 in which an event identical to a special event 12 in which the user character 4 got involved in the past has not occurred, this participation is restricted. However, an event equivalent to a special event 12 in which the user character 4 got involved in the past may be regarded as the identical event, and his/her participation therein may be restricted. In such cases, the game server system 1100G may separately store equivalent-event-related data. The equivalent-event-related data is a list of events that are not strictly identical events but can be regarded as being equivalent. In a process of generating an application restriction determination result 557 and an application restriction determination result 557g, in addition to an event identical to a special event 12 in which a user character 4 got involved in the past, an equivalent event associated with the special event 12 in which the user character 4 got involved in the past by the corresponding event relationship data is also treated as a process target.

Modification Example 5

In the foregoing embodiment, for example, a game server system 1100G generates an image (game image) to be displayed on each user terminal 1500; however, each user terminal 1500 may generate an image. In such cases, the game server system 1100G may transmit data necessary for rendering to each user terminal 1500 in order to cause each user terminal 1500 to perform rendering.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

The invention claimed is:

1. A computer system comprising at least one processor, or circuit programmed, to execute:
   managing occurrence incidents for respective virtual spaces, the occurrence incidents being incidents that occur, the virtual spaces being set to provide a 3 dimensional virtual world that represents a common world view for all users, and allowing users to participate in said virtual space;
   managing a participation record of a target user in a first virtual space; and
   managing a restriction on participation of the target user in any of virtual spaces other than the first virtual space, based on (a) a difference between a first occurrence incident being the occurrence incident in the first virtual space, and the occurrence incident in each of the virtual spaces other than the first virtual space, and (b) the participation record of the target user in the first virtual space.

2. The computer system as defined in claim 1, wherein the managing a restriction includes determining whether each of the virtual spaces other than the first virtual space is a restricted virtual space, the restricted virtual space being a target for which participation of the target user is restricted, and managing the restriction on the target user in the restricted virtual space.

3. The computer system as defined in claim 2, wherein the at least one processor or circuit is further programmed to execute selecting a second virtual space in which the target user participates, from among the virtual spaces other than the first virtual space, based on whether each of the virtual spaces is the restricted virtual space.

4. The computer system as defined in claim 3, wherein the managing a restriction includes managing the restriction in the restricted virtual space by prohibiting the participation of the target user.

5. The computer system as defined in claim 3, wherein the selecting a second virtual space includes
   accepting a participation request virtual space other than the first virtual space, based on a selection operation by the target user, and
   selecting the participation request virtual space as the second virtual space, when the participation request virtual space is not the restricted virtual space.

6. The computer system as defined in claim 3, wherein the selecting a second virtual space includes
   presenting, to the target user, whether each of the virtual space other than the first virtual space is the restricted virtual space, and
   accepting a virtual space in which the target user requests participation as the second virtual space, from among the virtual spaces that are not the restricted virtual space, based on a selection operation by the target user.

7. The computer system as defined in claim 2,
   wherein the at least one processor or circuit is further programmed to execute selecting a second virtual space in which the target user participates, from among the virtual spaces other than the first virtual space, and
   wherein the managing a restriction includes performing an action restriction management by which the restriction on an action of the target user participating in the second virtual space is managed when the second virtual space is the restricted virtual space.

8. The computer system as defined in claim 7, wherein the at least one processor or circuit is further programmed to execute predetermined special treatment control so that the target user or a character operated by the target user is treated specially in the second virtual space, based on the restriction managed by the action restriction management.

9. The computer system as defined in claim 7, wherein the performing an action restriction management includes managing a restriction on the action of the target user involved in an incident that has already occurred in the first virtual space but have not yet occurred in the second virtual space, based on the first occurrence incident and a second occurrence incident being an occurrence incident in the second virtual space.

10. The computer system as defined in claim 7, wherein the at least one processor or circuit is further programmed to execute control so as to notify the target user that the action of the target user is to be restricted in the second virtual space before the target user participates in the second virtual space.

11. The computer system as defined in claim 7, wherein the selecting a second virtual space includes presenting, to the target user, whether each of the virtual space other than the first virtual space is the restricted virtual space, and selecting the second virtual space based on a selection operation by the target user.

12. The computer system as defined in claim 7, wherein the selecting a second virtual space includes automatically selecting a second virtual space in which the target user participates and preferentially selecting a virtual space that is not the restricted virtual space.

13. The computer system as defined in claim 2, wherein the managing a restriction includes determining that, of the virtual spaces other than the first virtual space, a virtual space in which an occurrence incident equivalent to the first occurrence incidence has not occurred is the restricted target virtual space.

14. The computer system as defined in claim 2, wherein the managing a restriction includes determining that, of the virtual spaces other than the first virtual space, a virtual space in which an occurrence incident equivalent to the first occurrence incident has not occurred and in which an occurrence incident in which the target user is determined to get involved in the first virtual space based on the participation record has not occurred is the restricted virtual space.

15. The computer system as defined in claim 1, wherein the at least one processor or circuit is further programmed to perform asynchronous execution control of events in the plurality of virtual spaces, the events being identical to each other.

16. The computer system as defined in claim 15, wherein the events include regular events and special events, the managing occurrence incidents includes managing the special events as the occurrence incidents.

17. The computer system as defined in claim 1, wherein each server includes a plurality of servers that control one or more of the virtual spaces.

18. A virtual space control system comprising:

a computer system as defined in claim 1; and a user terminal that acts a man-machine interface for the users.

19. A virtual space control method executed by a computer system, the method comprising:

managing occurrence incidents for respective virtual spaces, the occurrence incidents being incidents that occur, the virtual spaces being set to provide a 3 dimensional virtual world that represents a common world view for all users, and allowing users to participate in said virtual space;

managing a participation record of a target user in a first virtual space; and managing a restriction on participation of the target user in any of virtual spaces other than the first virtual space, based on (a) a difference between a first occurrence incident and the occurrence incident in each of the virtual spaces other than the first virtual space, and (b) the participation record of the target user in the first virtual space, the first occurrence incident being the occurrence incident in the first virtual space.

* * * * *